United States Patent
Marquier et al.

(10) Patent No.: US 12,146,575 B2
(45) Date of Patent: Nov. 19, 2024

(54) MIXER DEVICE FOR A VALVE SYSTEM

(71) Applicant: VERNET, Ollainville (FR)

(72) Inventors: Samuel Marquier, Evry (FR);
Guillaume Robin, Montgeron (FR)

(73) Assignee: VERNET, Ollainville (FR)

(*) Notice: Subject to any disclaimer, the term of this patent is extended or adjusted under 35 U.S.C. 154(b) by 0 days.

(21) Appl. No.: 18/254,279

(22) PCT Filed: Nov. 26, 2021

(86) PCT No.: PCT/EP2021/083211
§ 371 (c)(1),
(2) Date: May 24, 2023

(87) PCT Pub. No.: WO2022/112517
PCT Pub. Date: Jun. 2, 2022

(65) Prior Publication Data
US 2024/0003453 A1    Jan. 4, 2024

(30) Foreign Application Priority Data
Nov. 27, 2020  (FR) ..................................... 2012287

(51) Int. Cl.
*F16L 11/04* (2006.01)
*F16K 11/044* (2006.01)
(Continued)

(52) U.S. Cl.
CPC ........ *F16K 11/044* (2013.01); *F16K 27/0263* (2013.01); *F16K 31/002* (2013.01)

(58) Field of Classification Search
CPC ......... G05D 23/153; F16K 1/443; F16K 1/44; F16K 1/54; F16K 1/52; F16K 11/04; F16K 31/002; F16K 27/0263
See application file for complete search history.

(56) References Cited

U.S. PATENT DOCUMENTS

2002/0130189 A1    9/2002  Mace et al.
2018/0196450 A1*   7/2018  Jager ...................... F16K 11/06
(Continued)

FOREIGN PATENT DOCUMENTS

| EP | 1692580 A1 | 8/2006 |
| FR | 2821411 A1 | 8/2002 |
| WO | 2005054971 A1 | 6/2005 |

OTHER PUBLICATIONS

Search Report for International Application No. PCT/EP2021/083211 dated Feb. 25, 2022.
(Continued)

*Primary Examiner* — Kelsey E Cary
(74) *Attorney, Agent, or Firm* — Pearne & Gordon LLP

(57) ABSTRACT

A device for a valve system, comprising a housing, a slide valve movable between a distal seat and a proximal seat of the housing, and a control moving the slide valve. The housing comprises a base, which contains the slide valve and delimits a proximal opening, a spacer, which comprises an internal ring inserted in the proximal opening, and a cover, which contains part of the control. To improve compactness and simplify assembly, the base forms the distal seat and the spacer forms the proximal seat, while the cover comprises a cover fin, to rest against a proximal edge delimiting the proximal opening, and the spacer comprises a spacer fin to rest against the proximal edge, the cover fin and the spacer fin being successive along the proximal edge.

13 Claims, 10 Drawing Sheets

(51) Int. Cl.
*F16K 27/02* (2006.01)
*F16K 31/00* (2006.01)

(56) References Cited

U.S. PATENT DOCUMENTS

| | | | |
|---|---|---|---|
| 2018/0328500 A1* | 11/2018 | Jager | F16K 31/002 |
| 2020/0285257 A1* | 9/2020 | Belair | G05D 23/1353 |
| 2022/0163985 A1* | 5/2022 | Belair | G05D 23/1353 |
| 2023/0129850 A1* | 4/2023 | Robin | E03C 1/0403 |
| | | | 137/15.21 |
| 2023/0221740 A1* | 7/2023 | Marquier | F16K 11/044 |
| | | | 236/12.11 |

OTHER PUBLICATIONS

Search Report for French Application No. FR2012287 dated Apr. 4, 2021.

\* cited by examiner

MIXER DEVICE FOR A VALVE SYSTEM

CROSS-REFERENCE TO RELATED APPLICATIONS

This is a National Stage application of PCT international application PCT/EP2021/083211, filed on Nov. 26, 2021, which claims priority from French Patent Application No. 2012287, filed on Nov. 27, 2020 both which are incorporated herein by reference in their entirety.

The present invention relates to a device, for a valve system, as well as a valve system, comprising such a device.

FR 2 821 411 A1 describes a cartridge for mixing cold water with hot water and adjusting the flow rate of the resulting mixed water. To adjust the flow rate, the cartridge includes flow rate adjusting discs, controlled by a flow rate control handle. To regulate the temperature in a thermo-regulated way, the cartridge comprises a slide valve, which is operated by a temperature control lever, through a thermostatic element and an overtravel compensation system. In order to conduct the flow of water and house the various components, this cartridge comprises a housing, capped by a plug, itself capped by the flow control lever, itself capped by the temperature control lever. The disadvantage of this known cartridge is that, in order to circulate water, it is necessary to provide an assembly of many parts, including the housing, the plug, the two levers, a lower disc and an upper disc, requiring numerous seals at the interfaces of this assembly. The implementation of many seals takes up a significant amount of space, not only because of the seals themselves, but also because of the grooves and recesses arranged in the parts to accommodate the seals. This results in a relatively bulky cartridge, especially along its central axis.

In general, it is difficult to reduce the number of parts for this type of cartridge, since each part is generally obtained by molding, so that their faces must necessarily be undercut to be obtained by this manufacturing method. This constraint on the shape of the parts is in contradiction with the need to obtain two opposite seats facing each other along the central axis, against which the slide rests at the end of its stroke, and to obtain that the inlets and outlets open onto the bottom of the housing. FR 2 821 411 A1 provides, for example, a seat formed by the flow control lever, and a seat formed by the upper disc, while the eccentric inlet ducts and the central outlet duct are formed by the housing.

The invention therefore aims to remedy the disadvantages of the prior art, by proposing a new device which, while being designed to exchange water flows from the bottom and having a slide valve that rests against a distal seat and a proximal seat, is particularly compact and presents few assembled parts.

The invention has as its object a device for a valve system, the device comprising: a housing, which comprises a bottom, and by means of which the device can be coupled with a socket of the valve system, so that the housing exchanges water flows with the socket by means of the bottom; a slide valve, which, in order to adjust the flow of at least one of said water flows, is movable in translation inside the housing, parallel to a longitudinal axis of the housing passing through the bottom, between a distal position, in which the slide valve rests against a distal seat of the housing and a proximal position, in which the slide valve rests against a proximal seat of the housing, the proximal seat being rotated in a distal direction parallel to the longitudinal axis and the distal seat being rotated in a proximal direction opposite to the distal direction; and a control, for displacing the slide valve in translation. The housing comprises: a base, which contains the slide valve and forms the bottom of the housing, the base comprising a proximal edge with a closed contour, surrounding the longitudinal axis and delimiting a proximal opening of the base, the distal direction being oriented from the proximal edge toward the bottom; a spacer, which comprises an inner ring at least partially inserted in the proximal opening and being traversed by the longitudinal axis; and a cover, which contains a portion of the control, the control, traversing the inner ring to displace the slide valve.

According to the invention: the base forms the distal seat and the spacer forms the proximal seat, the proximal seat being carried by the inner ring; the cover comprises a cover fin, by means of which the cover presses against the proximal edge in the distal direction; and the spacer comprises a spacer fin, which is fixedly attached to the inner ring and by means of which the spacer presses against the proximal edge in the distal direction, the cover fin and the spacer fin being successive along the proximal edge.

Thanks to the invention, a minimum number of parts is obtained to form the housing, since the distal seat and the proximal seat are directly formed by parts of the housing, namely the base and the spacer, while these parts of the housing are, furthermore, used to conduct the water flows, containing the slide valve and forming the bottom for the exchange of said water flows with the socket. The main function of the base being to form the bottom, oriented in the distal direction, and to form the distal seat, oriented in the proximal direction, it is easy to obtain the base in the form of a single integral part, for example by molding with a single mold where the parts of the mold are movable relative to each other, parallel to the longitudinal axis. The main function of the cover being to enclose a portion of the control, can for example be given a tubular or bell shape, centered on the longitudinal axis, so that it is easy to obtain the cover as a single, integral part, for example by molding with a single mold where the parts of the mold are movable relative to each other and parallel to the longitudinal axis. The main functions of the spacer being to form the proximal seat, oriented along the distal direction, to complete the base to conduct at least one of the water flows, to complete the cover and to enclose part of the control inside the cover and optionally to form a partition wall between the inside of the base and the inside of the cover, it is easy to obtain the spacer in the form of a single, integral part, for example by molding with a single mold where the parts of the mold are movable relative to each other and parallel to the longitudinal axis. Advantageously, the housing is constituted of only three assembled parts, namely the cover, the spacer and the base, such that the containment of water flows inside the housing vis-a-vis the outside is easy to ensure, for example with the help of only two seals, or in any case a particularly small number of seals. Since the number of seals is small, the housing is particularly compact, both radially and axially. In addition, the cover fin and the spacer fin being received held side-by-side against the same proximal edge of the base, preferably in the same assembly plane, orthogonal to the longitudinal axis, the housing is particularly compact, since the interface between the cover, the spacer and the base is within the same thickness.

Preferably, the inner ring comprises a distal face, which carries the proximal seat, and a proximal face, which is opposite to the distal face, which closes the cover, the spacer fin projecting along the proximal direction relative to the proximal face.

Preferably, the inner ring comprises an outer radial edge that surrounds the longitudinal axis and the base comprises a first inner radial surface, which surrounds the longitudinal axis, which ends at the proximal edge along the proximal direction and which surrounds the outer radial edge, the spacer being inserted into the proximal opening by radial complementarity of the outer radial edge with the first inner radial surface, preferably by means of a seal of the device, which is radially interposed between the outer radial edge and the first inner radial surface.

Preferably, the spacer fin comprises a first radial positioning surface; and the cover comprises a second radial positioning surface, which surrounds the longitudinal axis, the cover being radially aligned with the spacer by radially abutting the second radial positioning surface against the first radial positioning surface.

Preferably, the cover fin and the spacer fin are in anti-rotational abutment about the longitudinal axis against each other.

Preferably, the base comprises a tooth, which projects from the proximal edge and the cover fin and/or spacer fin is/are in anti-rotational abutment against the tooth, about the longitudinal axis.

Preferably, the cover fin comprises two legs that provide an inner free portion therebetween and the tooth is received in the inner free portion to secure the base and the cover relative to each other in rotation about the longitudinal axis.

Preferably, the device comprises a fastener, which is formed by the base and the cover, by means of which the base is attached to the cover, such that the base is retained relative to the cover in the distal direction by means of the fastener.

Preferably, the cover is constituted by a first integral part, the spacer is constituted by a second integral part, and the base is constituted by a third integral part Preferably the housing comprises: a mixing chamber, which is delimited by the base and which opens out of the housing by means of the bottom, for the delivery of an outgoing water flow, from among said water flows, from the mixing chamber toward the socket, by means of the bottom, when the device is coupled with the socket; a primary chamber, which is delimited by the base, and which opens out of the housing by means of the bottom, for admitting a primary incoming water flow, from among said water flows, from the socket toward the primary chamber, by means of the bottom, when the device is coupled with the socket, the primary chamber leading the primary incoming water flow to the mixing chamber by means of a primary passage provided between the distal seat and the slide valve; and a secondary chamber, which is delimited by the base and the spacer, and which opens out of the housing by means of the bottom, for admitting a secondary incoming water flow, from among said water flows, from the socket toward the secondary chamber, by means of the bottom, when the device is coupled with the socket, the secondary chamber conducting the secondary incoming water flow to the mixing chamber by means of a secondary passage provided between the proximal seat and the slide valve, the outgoing water flow being formed by mixing the primary incoming water flow with the secondary incoming water flow within the base.

Preferably, the control comprises a thermostatic actuator, which comprises: a primary part, which is at least partially contained in the base to be immersed in one of said water flows, the slide valve and the primary part being preferably fixed in translation relative to each other along the longitudinal axis; and a secondary part, which is at least partially contained in the cover and which is moved, relative to the primary part in translation along the longitudinal axis, as a function of the temperature of the water flow in which the primary part is immersed. Preferably the control comprises a control member, which is at least partially contained in the cover and which is configured to move the slide valve in translation relative to the housing along the longitudinal axis, by displacing the secondary part.

The invention also relates to a valve system comprising the device and the socket as defined above, the device being coupled with the socket by means of the bottom so that the housing exchanges said water flows with the socket by means of the bottom.

The invention will be better understood from the description below, given only as a non-limiting example, and made with reference to the drawings listed below:

FIGS. 1 to 6 show a device 1 according to a first embodiment in accordance with the invention. This device 1 is preferably for sanitary use, being connected to a sanitary water network, for example for a dwelling or professional premises.

The device 1 is presented here in the form of a cartridge, preferably for mixing incoming water flows F1 and F2 to form an outgoing water flow F3. The device 1, for connection to the sanitary water system, is configured to be coupled with a socket 60, a part of which is shown as a dashed line in FIGS. 5 and 6, which together form a valve system. The valve system is preferably constituted of a wall-mounted system, the socket 60 being provided to be partially embedded in a wall, or more generally in a masonry wall, regardless of its orientation. The valve system is preferably a mixer for a shower or a bathtub, the socket 60 being designed for example, to supply a shower head, a rain shower head and/or a bathtub spout. Alternatively, the socket 60 forms the socket of a sink or washbasin tap, the tap further comprising a washbasin spout. In this case, for example, the socket is intended to be implemented in a sink vanity unit or worktop, in a backsplash adjacent to the vanity unit or worktop, or in the sink or washbasin itself.

Figure 5:
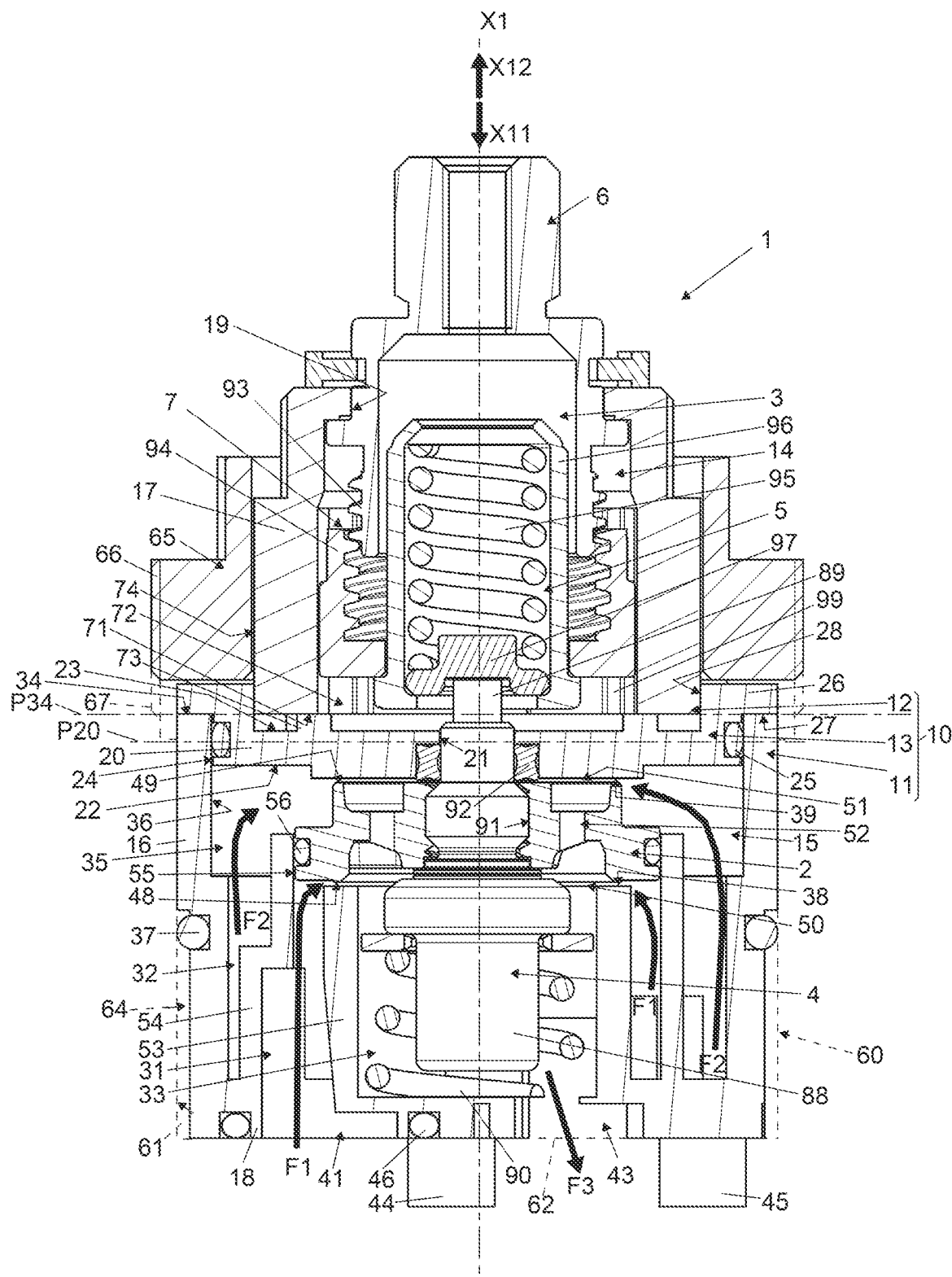
FIG. 5 is a longitudinal cross-sectional view of a valve system comprising the device of FIGS. 1 to 4, along a sectional line V-V shown in FIG. 2.
Figure 6:
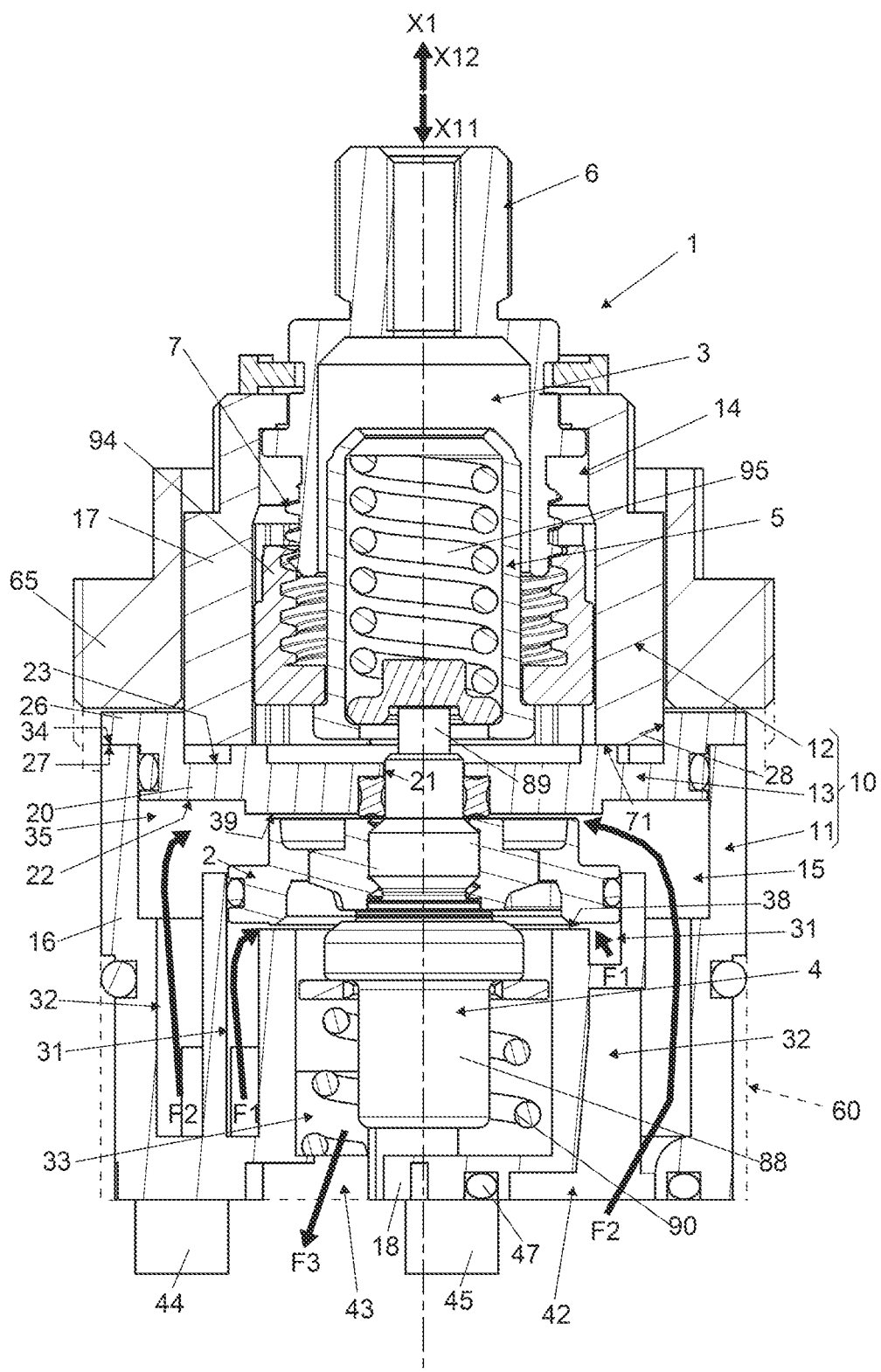
FIG. 6 is a longitudinal cross-sectional view of the valve system of FIG. 5, along a sectional line VI-VI shown in FIG. 2.

FIGS. 5 and 6 show that the device 1 comprises a housing 10, as well as a slide valve 2, contained in the housing 10, and a control 3, at least partially contained in the housing 10. The device defines a longitudinal axis X1, which is fixed relative to the housing 10. Unless otherwise noted, terms such as "radial," "axial," "coaxial," "central," "longitudinal," and "transversal" refer to the longitudinal axis X1. The cross-sections in FIGS. 5 and 6 are along two different planes comprising the axis X1.

The device 1 also defines a distal direction X11, which is parallel to the axis X1, and a proximal direction X12, which is parallel to the axis X1 and opposite in direction to the distal direction X11. When the term "distal" is used, it is a reference to the X11 direction, while when the term "proximal" is used, it is a reference to the X12 direction, unless otherwise noted.

As shown in FIGS. 1 to 6, the housing 10 consists of only three pieces, namely a cover 12, a spacer 13, and a base 11, which are superimposed in that order along the distal X11 direction. These three pieces are distinct from each other. The cover 12 is preferably formed in one piece, in other words, it is monobloc and is not the result of an assembly. The base 11 is preferably formed in one piece, in other words, it is monobloc and is not the result of an assembly. The spacer 13 is preferably formed in one piece, in other words, it is monobloc and is not the result of an assembly. Each of these three pieces advantageously presents a respective shape that allows it to be manufactured individually, in a single molding operation, in a single mold, for example by injection of polymer plastic. For each piece, a first part of the mold is advantageously displaced along the axis X1 relative to a second part of the mold. The housing 10 is designed to be the seat of a circulation of water flow, here water flows F1, F2 and F3, which are exchanged between the housing 10 and the socket 60 when the device is coupled on said socket 60.

Preferably, the housing 10 externally presents a general shape of revolution about the axis X1. The housing 10 defines a proximal end, which is formed by the cover 12 and a distal end, which is formed by the base 11, the distal and proximal ends being traversed by the axis X1. The housing 10 comprises an outer peripheral wall that connects its distal end to its proximal end surrounding the axis X1. From the distal end, the peripheral wall of the housing 10 is formed by a peripheral wall 16 of the base 11. From the proximal end, the peripheral wall of the housing 10 is formed by a peripheral wall 17 of the cover 12.

At its distal end, the housing 10 comprises a bottom 18. The bottom 18 is traversed by the axis X1. The bottom 18 is entirely formed by the base 11, in one piece with the peripheral wall 16. For the exchange of flows F1, F2 and F3 with the socket 60, the device 1 is coupled with the socket 60 by means of the bottom 18 which is received by the socket parallel to the axis X1. The exchange of flows F1, F2 and F3 then takes place by means of the bottom 18, in other words, the flows F1, F2 and F3 traverse the bottom 18.

Preferably, the housing 10 presents a control opening 19 at its proximal end. The control opening 19 is coaxial with the axis X1. The opening 19 is delimited by the peripheral wall 17. It is by means of the opening 19 that the control 3 can be operated from outside the device 1.

On the inside, the housing 10 comprises an inner ring 20, which is entirely formed by the spacer 13. The inner ring 20 preferably extends along a plane of the ring P20, which is perpendicular to the axis X1. The ring 20 is arranged between the opening 19 and the bottom 18. The ring 20 is traversed by the axis X1. The ring 20 provides a central opening 21 that is coaxial with the axis X1, so that the inner ring 20 could be described as the inner shoulder of the housing 10. This opening 21 is preferably modest in size relative to the cross section of the peripheral walls 16 and 17.

In the present example, the inner ring 20 occupies a transversal section of the housing 10, separating the housing 10 into a distal compartment 15, which is delimited by the base 11 and the spacer 13, and a proximal compartment 14, which is delimited by the cover 12 and the spacer 13. In other words, along the axis X1, the inner ring 20 is arranged at the junction between the base 11 and the cover 12. The compartments 14 and 15 are distributed successively along the axis X1, the compartment 15 being arranged in the distal direction X11 relative to the compartment 14. The central opening 21 opens into the compartment 14 along the proximal direction X12 and into the compartment 15 along the distal direction X11.

In the present example, the compartment 15 may be referred to as the "mixing compartment", as it contains the slide valve 2. More generally, the compartment 15 is the seat of a flow control of all or part of the water flows F1, F2 and F3 by the slide valve 2. For this purpose, the slide valve 2 can be moved in translation inside the base 11, in other words, inside the compartment 15, relative to the housing 10, along the axis X1.

The proximal compartment 14 can be referred to as a "control compartment", as part of the control 3 is housed there. The function of the control 3 is to actuate the translation of the slide valve 2 in order to adjust the flow rate of the water flows F1, F2 and/or F3. For this purpose, the control 3 extends into both compartments 14 and 15 at the same time, through the central opening 21.

The peripheral wall 16 of the base 11 is preferably tubular in shape, surrounding the axis X1 and being centered on the axis X1. The peripheral wall 16 is preferably in the form of a circular-based cylinder centered on the axis X1, or a succession of circular-based cylinders centered on the axis X1 and distributed along the axis X1. As seen, for example, in FIGS. 1, 3 and 4, the wall 16 is shaped like a succession of two cylinders.

In the proximal direction X12, the peripheral wall 16 ends in a proximal edge 34. The proximal edge 34 describes a closed contour about the axis X1, which is centered on the axis X1. Preferably, the proximal edge 34 is flat, and forms a crown-like surface surrounding the axis X1. The proximal edge 34 extends along an assembly plane P34 of the housing which is perpendicular to the axis X1. The plane P34 is arranged in the proximal direction X12 relative to the plane P20. Internally, from the proximal edge 34, the peripheral wall 16 forms an inner radial surface 36 of the base 11. The inner radial surface 36 surrounds the axis X1 by being coaxial with this axis. Along the proximal direction X12, the inner radial surface 36 extends to the inner contour of the proximal edge 34. In other words, the surface 36 ends at the proximal edge 34.

The peripheral wall 16, and in particular the proximal edge 34 and the inner radial surface 36, delimits a proximal opening 35 of the base 11 by surrounding it. The proximal opening 35 opens in the proximal direction X12. In the present example, a function of the spacer 13 is to close the proximal opening 35 of the base 11 with the ring 20, by being attached to the base 11. Here the ring 20 has a function of an internal partition.

More precisely, on either side of the plane P20, the ring 20 advantageously comprises a distal face 22, which is turned in the distal direction X11, toward the inside of the base 11, and a proximal face 23, which is turned in the proximal direction X12, toward the inside of the cover 12. The proximal face 23 is thus axially opposite the distal face 22. Preferably, the distal face 22 and the proximal face 23 present a generally discoidal or crown shape centered on the axis X1. The central opening 21 opens from face 22 in the distal direction X11 and from face 23 in the proximal direction X12. The ring 20 further comprises an outer radial edge 24, which surrounds the axis X1 and connects the face 22 to face 23.

The inner ring 20 is preferably received in the base 11, within the proximal opening preferably by being inserted along the axis X1, in a press-fit manner. Preferably, the ring 20 occupies most of the transverse section of the proximal opening 35, or even completely closes the proximal opening 35, except at the central opening 21, like an internal partition. More precisely, the press-fit is achieved by radial complementarity of the outer radial edge 24 with the inner radial surface 36. The inner radial surface 36 of the base 11 surrounds the outer radial edge 24 of the ring 20, so that the radial edge 24 is radially in contact with the inner radial surface 36, or at least provides a small clearance allowing the inner ring 20 to fit into the base 11. Preferably, the device 1 comprises a seal 25, here an which is radially interposed between the edge 24 and the surface 36 to ensure a seal between the outside and the inside of the compartment 15 at the proximal opening 35. In this case, the fitting of the ring 20 into the base 11 may be carried out by means of the seal 25, which is radially interposed between the edge 24 and the surface 36. Preferably, the seal 25 is carried by a peripheral groove formed on the edge 24.

As seen in FIGS. 1 to 6, the spacer 13 comprises a plurality of fins 26, each fin 26 being referred to as a "spacer fin". Here, for example, four fins 26 are provided, however a different number of fins 26 could be provided. At a minimum, the spacer 13 comprises a single fin 26.

Each fin 26 is preferably formed integrally with the ring 20. More generally, each fin 26 is fixedly integral with the inner ring 20, in other words, is fixed relative to the ring 20 by being attached thereto.

Each fin 26 projects axially from the ring 20, along the proximal direction X12, relative to the proximal face 23 of the ring 20. In other words, each fin 26 extends in the proximal direction X12 from the assembly plane P34, while the inner ring 20 extends in the distal direction X11 from the assembly plane P34. More generally, each fin 26 is arranged entirely in the proximal direction X12 relative to the plane of the ring P20 and even relative to the inner ring 20.

Each fin 26 extends along the edge 24 of the ring 20. In other words, the fins 26 are peripheral elements of the spacer 13. Each fin 26 projects radially from the edge 24, in other words, projects from the edge 24 along an outward radial direction. In other words, each fin 26 overhangs the edge 24. About the axis X1, each fin 26 extends over only a portion of the edge 24, so as to leave a portion of the proximal face 23 along the edge 24 free. If a plurality of fins 26 are provided, they are spaced apart from each other about the axis X1 along the edge 24, so that two successive fins 26 leave a portion of the proximal face 23 between them free along the edge 24, about the axis X1. Preferably, the fins 26 are evenly distributed around the axis X1, so that the portions left free between them are evenly distributed about the axis X1.

The spacer 13 is held in the distal direction X11 against the base 11, by bringing each fin 26 to rest against the proximal edge 34. More precisely, each fin 26 presents a distal surface 27, which comes to rest axially against the proximal edge 34. For this purpose, the distal surface 27 extends along the plane P34, as visible in FIGS. 5 and 6. In other words, the surface 27 is parallel to the ring 20, that is, perpendicular to the axis X1. The distal surface 27 extends radially outward from the edge 24, so as to form an axial shoulder of the spacer 13. Here, the distal surface 27 forms a portion of a crown centered on the axis X1. The distal surface 27 is offset in direction X12 relative to the plane P20, in other words, relative to the ring 20, so that when the spacer 13 is held against the edge 34, the ring 20, at least partially arranged beyond the proximal edge 34 along the distal direction X11. The pressing of each fin 26 against the edge 34 occupies as many portions of the edge 34, but leaves other portions of the edge 34 free, where no fin 26 is pressing, in particular between two successive fins 26.

As a result, the assembly formed by the spacer 13 and the base 11 is particularly compact along the axis X1. Moreover, the assembly of the spacer 13 on the base 11 is particularly easy to carry out, since it is sufficient to slip the ring 20 of the spacer 13 into the proximal opening 35 of the base 11 to align the spacer 13 with the base 11, and to slide the spacer 13 in the distal direction X11 until the fins 26 come into axial abutment against the proximal edge 34.

In the distal direction X11, the peripheral wall 16 ends at the bottom 18 of the housing 10. In other words, the peripheral wall 16 axially connects the ring 20 to the bottom 18 to delimit the compartment 15. The distal direction X11 is thus oriented from the proximal edge 34 toward the bottom 18. Preferably, the bottom 18 presents the form of a transversal wall, which is perpendicular to the axis X1 and is traversed by the axis X1.

Preferably, when the housing 10 is coupled to the socket 60, the base 11 is at least partially received in a recess 64 belonging to the socket 60, the base 11 and the recess 64 being complementary and indexed. The housing 10 is inserted into the recess 64 along the distal direction X11. The recess 64 is shown schematically in dotted lines in FIGS. 5 and 6. The base 11 forms a male part while the recess 64 of the socket 60 forms a complementary female part. The recess 64 is advantageously closed by the base 11 when the device 1 is coupled with the socket 60.

The recess 64 of the socket 60 advantageously has an internal peripheral wall 61, which surrounds an axis of the recess that is coaxial with the axis X1 when the device 1 is coupled. This inner peripheral wall 61 surrounds a portion of the base 11 extending from the bottom 18. In particular, this wall 61 surrounds a portion of the wall 16, which is inserted therein by being preferentially pressed therein. Advantageously, the device 1 comprises a peripheral seal 37, circular in shape, such as an O-ring, which is centered on the axis X1. The seal 37 is here carried by the base 11, in particular by the peripheral wall 16. For this purpose, the base 11 provides, for example, a peripheral groove on the outer surface of the wall 16 to accommodate said seal 37. When the housing 10 is coupled to the socket 60, the seal 37 is in radial contact with the peripheral wall 61 of the recess 64 to ensure the watertightness of the closure of the recess 64 by the base 11, as illustrated in FIGS. 5 and 6.

Advantageously, the recess 64 of the socket 60 presents a bottom wall 62, which is transversal and closes the wall 61. When the housing 10 is coupled, the wall 62 is traversed by the axis X1, preferably being orthogonal with the axis X1. When the housing 10 is coupled, the device advantageously comes into axial abutment according to the distal direction X11 against the wall 62, by means of the bottom 18.

In the present example, the water flows F1 and F2 are incoming water flows, which are admitted into the housing 10 via the bottom 18, these flows F1 and F2 coming from the socket 60, when the housing 10 is coupled with the socket 60. The flow F1 is called "primary incoming water flow" and the flow F2 is called "secondary incoming water flow". The flows F1 and F2 are advantageously water flows coming from a sanitary water network supplying the socket 60. For example, the water flow F1 passes through a primary inlet opening 41 provided through the bottom 18, and shown in particular in FIGS. 1 and 5. For example, the water flow F2 passes through a secondary inlet opening 42 provided through the bottom 18, and shown in particular in FIGS. 1 and 6.

In the present example, the water flow F3 is an outgoing water flow, which is discharged out of the housing 10 via the bottom 18, and transmitted to the socket 60, when the housing 10 is coupled with the socket 60. Advantageously, the flow F3 serves to supply the valve spout or shower head of the valve system. For example, the water flow F3 passes through an outlet opening 43 provided through the bottom 18.

More precisely, it is by means of the openings 41, 42 and/or 43 of the bottom 18, that the housing 10 comes to press against the wall 62 along the axis X1 when coupled, in particular for the purpose of ensuring the sealing of the fluid connections between the socket 60 and the device 1 for the exchange of the flows F1, F2 and F3.

In the present example, it is provided that the socket 60 presents two openings emerging from the bottom wall 62, one emitting the flow F1 to feed the opening 41 and the other emitting the flow F2 to feed the opening 42. To ensure a fluid connection between the opening 41 and the corresponding opening in the socket 60, and a fluid connection between the opening 42 and the corresponding opening in the socket 60, it is provided that the housing 10 presses against these openings in the socket 60 by means of the openings 41 and 42 along direction X11. Preferably, the opening 43 opens directly into the recess 64, so that the flow F3 floods the recess 64.

As shown only in FIG. 5, it is advantageously provided that the bottom 18 carries a seal 46, surrounding the opening 41, to ensure the sealing of the fluid connection between the opening 41 and the corresponding opening of the socket 60 relative to the recess 64 and the opening 43. As shown only in FIG. 6, it is advantageously provided that the bottom 18 carries a seal 47, surrounding the opening 42, for sealing the fluid connection between the opening 42 and the corresponding opening of the socket 60 relative to the recess 64 and the opening 43. Each seal 46 and 47 is preferably housed in a respective circular groove formed in the surface of the bottom 18 around the relevant opening 41 or 42, as visible in FIGS. 1, 5 and 6.

Figure 1:
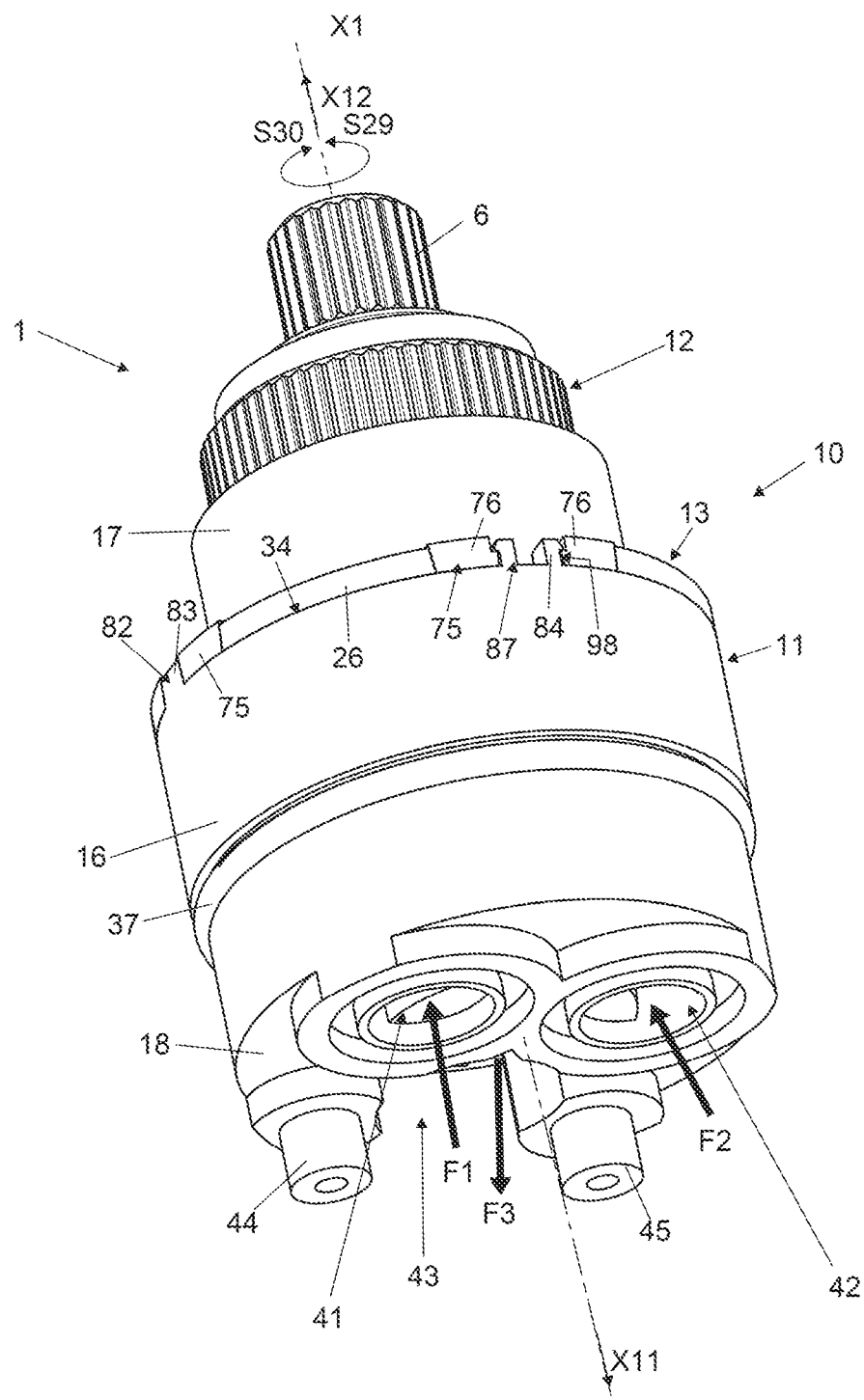
FIG. 1 is a perspective view of a device according to a first embodiment in accordance with the invention.
Figure 2:
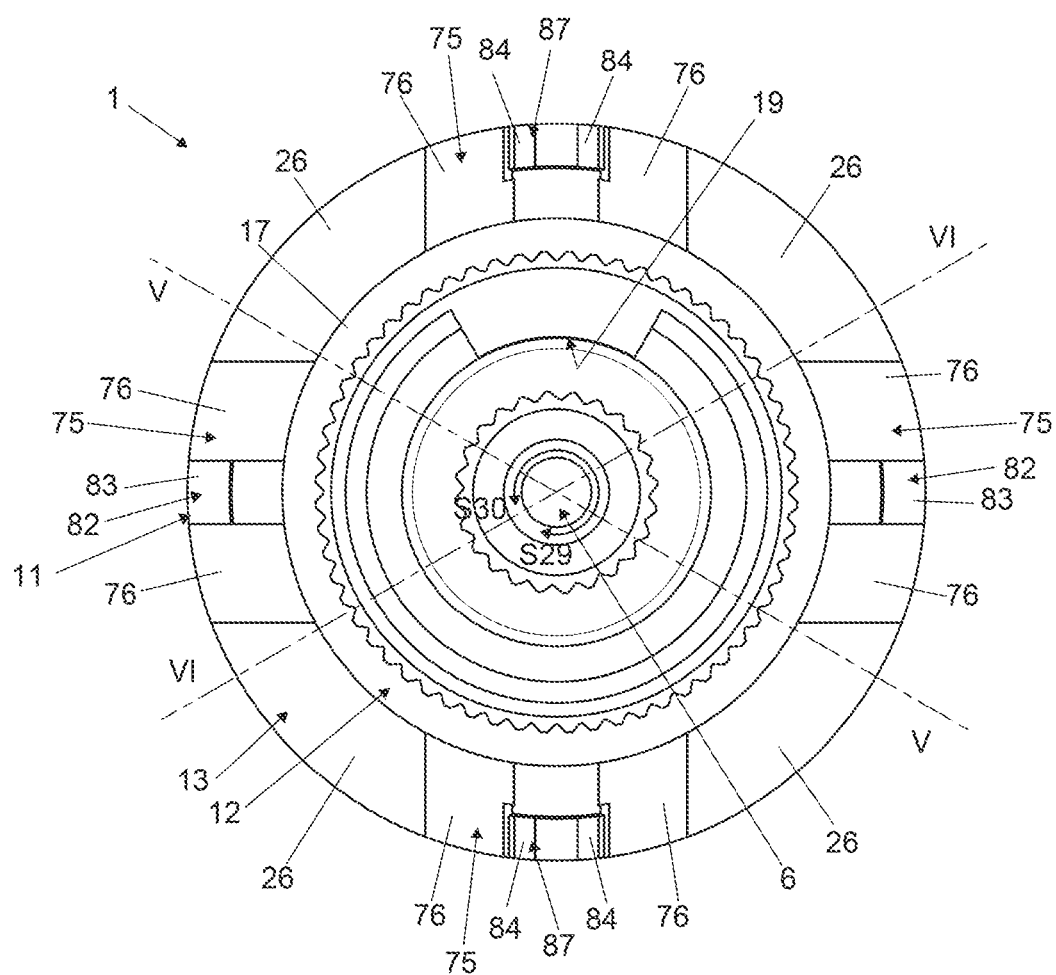
FIG. 2 is a proximal view of the device of FIG. 1.

Preferably, as best seen in FIGS. 1, 5 and 6, the base 11 includes plugs 44 and in other words, rods, which protrude from the bottom 18 along the distal direction X11, and which cooperate with complementary guides belonging to the socket 60, which open into the recess 64. The plugs 44 and 45, plugged into the guides, constitute a coding that ensures that the positioning of the device 1 in the recess 64 is correct for the coupling of the bottom with the recess 64, in particular for the orientation of the housing 10 relative to the socket 60 about the axis X1. This ensures that the openings 41, 42 and 43 are correctly positioned for their fluid connection with the socket 60. Alternatively, in place of the plugs 44 and 45, a single plug, or a number of plugs other than two, or any other anti-rotational form of the base 11 in the socket 60 may be provided.

In the present example, the slide valve 2 and the mixing compartment 15 together form a mixer, which when the housing 10 is coupled with the socket 60, is configured to form the outgoing water flow F3, by mixing the flows F1 and F2 admitted into the housing Preferably, the device 1 is designed so that the flow F1 is a hot water flow while the flow F2 is a cold water flow. By "cold water" is meant unheated running water, which is generally at or slightly below ambient temperature. "Hot water" is defined as running water that has been heated by a sanitary heating system.

More generally, the hot water presents a higher temperature than the cold water. Therefore, the water flow F3 resulting from the mixing of flows F1 and F2 by the mixer, is at an intermediate temperature between those of the flows F1 and F2, which depends on the proportion of the flows F1 and F2 for the mixture. The flow F3 can be called a mixed water flow and the device 1 a mixing device.

The housing 10 comprises a primary chamber 31, or inlet chamber, for conducting the water flow F1 within the housing 10, from the socket 60 to the slide valve 2. The primary chamber 31 opens out of the housing 10 through the opening 41 to admit the flow F1. The housing 10 comprises a secondary chamber 32, or inlet chamber, for conducting the water flow F2 within the housing 10, from the socket 60 to the slide valve 2. The secondary chamber 32 opens out of the housing 10 through the opening 42 to admit the flow F2. The housing 10 comprises a mixing chamber 33, or outlet chamber, for conducting the water flow F3 within the housing 10, from the slide valve 2 to the socket 60. The mixing chamber 33 opens out of the housing 10 through the opening 43 to discharge the flow F3. The chambers 31, 32 and 33 together constitute the compartment 15 and are all arranged within the base 11.

In the mixing compartment 15, the housing 10 comprises a distal seat 38 and a proximal seat 39. The distal seat 38 is formed by a surface of the housing 10, preferably flat, which is turned in the proximal direction X12, in other words, which is perpendicular to the axis X1. The proximal seat 39 is formed by a surface of the housing 10, preferably flat, which is turned in the distal direction X11, in other words, which is perpendicular to the axis X1. The distal seat 38 is arranged in the distal direction X11 relative to the proximal seat 39. Preferably, the seats 38 and 39 are arranged facing each other. In particular, the seats 38 and 39 are both traversed by the axis X1. Advantageously, the seats 38 and 39 are perpendicular to the displacement axis of the slide valve 2. The seats 38 and 39 have, for example, a discoid shape or crown shape, centered on the axis X1.

The slide valve 2 is arranged between the seats 38 and 39, being centered on the axis X1. The slide valve 2 presents a distal side 48, turned in the distal direction X11, and a proximal side 49, turned in the proximal direction X12. The sides 48 and 49 are preferably centered on the axis X1.

In FIGS. 5 and 6, the slide valve 2 is shown at an intermediate position of its translational stroke between two end positions, referred to as the "distal position" and the "proximal position" respectively. In the intermediate position shown in FIGS. 5 and 6, the slide valve 2 is positioned between the seats 38 and 39, so that the distal side 48 is not in contact with the seat 38 and the proximal side 49 is not in contact with the seat 39. A displacement of the slide valve 2 in axial translation relative to the housing 10 is limited by the seats 38 and 39, against which the slide valve 2 alternately comes into axial abutment. The slide valve 2 presses axially against the distal seat 38 by means of the distal side 48 in the distal direction X11, in order to limit the movement in translation of the slide valve 2 along the distal direction X11. Thus pressing against the seat 38, the slide valve 2 is in the distal position. On the other hand, the slide valve 2 is held axially against the proximal seat 39 in the proximal direction X12 by means of the side 49, to limit the movement in translation of the slide valve 2 in the proximal direction X12. Thus pressing against the seat 39, the slide valve 2 is in the proximal position. In the present example, a ring-shaped surface of the side 48, centered on the axis X1, comes into contact with a corresponding surface of the seat 38. In the present example, a crown-shaped surface of the side 49, centered on the axis X1, contacts a corresponding surface of the seat 39.

The distal seat 38 and the distal side 48 of the slide valve 2 provide a passage 50 between them, referred to as the "primary passage," the degree of opening of which varies depending on the translational position of the slide valve 2. When the slide valve 2 is in the distal position, the primary passage 50 is preferably closed, or almost closed, by the slide valve 2 being pressed against the seat 38, whereas in the proximal position, the primary passage 50 is open to the maximum because the slide valve 2 is away from the seat 38. Preferably, the passage 50 is annular in shape, and is provided all around the axis X1, extending axially from the seat 38 to the side 48 of the slide valve 2. The primary passage 50 is intended to be traversed by the flow F1.

The proximal seat 39 and the proximal side 49 of the slide valve 2 provide between them a passage 51, called the "secondary passage", the degree of opening of which varies according to the translational position of the slide valve 2. When the slide valve 2 is in the proximal position, the secondary passage 51 is preferably closed, or almost closed, by the slide valve 2 pressing against the seat 39, whereas in the distal position, the secondary passage 51 is open to the maximum because the slide valve 2 is away from the seat 39. Preferably, the passage 51 is annular in shape, and is provided all around the axis X1, extending axially from the seat 39 to the side 49 of the slide valve 2. Preferably, the passage 51 is arranged in the proximal direction X12 relative to the passage 50. The secondary passage 51 is intended to be traversed by the flow F2.

Generally speaking, the chambers 31, 32 and 33 are preferably coaxial, as visible in FIGS. 5 and 6, which allows for good compactness of the base 11. This arrangement also makes it easier to obtain the base 11 by molding, since most of its walls, except for the bottom 18, are oriented parallel to the axis X1. No wall of the base 11 is therefore undercut along the axis X1.

In particular, in the present example, the mixing chamber 33 is traversed by the axis X1, and connects the passages 50 and 51 to the outlet opening 43. The housing 10, in this case the base 11, preferably comprises an annular wall 53, which surrounds the axis X1 and is surrounded by the peripheral wall 16. The annular wall 53 rises from the bottom 18 in the proximal direction X12 and ends in a crown-shaped edge centered on the axis X1, which forms the distal seat 38. The annular wall 53 delimits the chamber 33 radially outward. Axially along the distal direction X11, the chamber 33 ends at the level of the bottom 18. Axially along the proximal direction X12, the chamber 33 terminates at the level of the seat 38.

Preferably, the primary chamber 31 surrounds the mixing chamber 33 presenting an annular shape centered on the axis X1. The primary chamber 31 is separated from the mixing chamber 33 by the annular wall 53. In other words, the annular wall 53 delimits the primary chamber 31 radially inward. The housing 10, in this case the base 11, preferably comprises an annular wall 54, which surrounds the annular wall 53 and the axis X1. The annular wall 54 rises from the bottom 18 in the proximal direction X12 and ends in an annular edge, which is axially spaced from the inner ring 20. The wall 54 is radially arranged between the peripheral wall 16 and the annular wall 53. The annular wall 54 delimits the primary chamber 31 radially outward, surrounding it. In the distal direction X11, the chamber 31 is preferably delimited by the bottom 18.

Preferably, the primary chamber 31 is itself surrounded by the secondary chamber 32, which presents an annular shape centered on the axis X1. The chamber 32 is delimited by the annular wall 54 radially inward and by the peripheral wall 16 radially outward. In the distal direction X11, the chamber 32 is preferentially delimited by the bottom 18. In the proximal direction X12, the chamber 32 is preferentially delimited by the inner ring 20, in particular the distal face 22. Thus, the delimitation of the compartment 15 by the housing 10 is effected by the base 11 and the spacer 13.

It is also intended that the spacer 13 forms the proximal seat 39. In particular, the proximal seat 39 is formed on the distal face 22 of the inner ring 20, preferably projecting in the distal direction X11. By providing that the proximal seat 39 is formed by the spacer 13 and the distal seat 38 is formed by the base 11, it is possible to obtain that the entire compartment 15 is delimited by only two integral parts of the housing 10 that are assembled, namely the base 11 and the spacer 13. Each of these two parts can thus present a shape that allows them to be obtained by individual molding as mentioned above.

As is clearly visible in FIG. 5, the primary chamber 31 opens into the mixing chamber 33 by means of the primary passage 50, preferably directly. Thus, the chamber 31 conducts the flow F1 from the opening 41 to the mixing chamber by means of the primary passage 50. The flow rate of the flow F1 is adjusted as it passes through the primary passage 50, depending on the position of the slide valve 2, determining the degree of opening of said passage 50.

The secondary chamber 32 opens into the mixing chamber 33 by means of the secondary passage 51, preferably by means of the slide valve 2, passing axially through it. To this end, the slide valve 2 advantageously comprises one or more axial openings 52, two of which are visible in FIG. 5. Each opening 52 passes through the slide valve 2 from one side to the other, to connect the side 49 to the side 48, along the axis X1. Radially, the outlet of each opening 52 on the side 48 extends between the passage 50 and axis X1, in other words, between the seat 38 and the axis X1. In other words, each opening 52 opens downstream of the primary passage 50 in consideration of the flow direction F1. Each opening 52 opens into the chamber 33 without opening into the chamber 31. Radially, the outlet of each opening 52 on the side 49 extends between the passage 51 and the axis X1, in other words, downstream of the passage 51, in consideration of the flow direction of the flow F2.

Thus, the chamber 32 conducts the flow F2 from the opening 42 to the mixing chamber 33 by means of the secondary passage 51, so that the flow rate of the flow F2 is regulated as it passes through the secondary passage 51, depending on the position of the slide valve 2, determining the degree of opening of said passage 51.

More generally, it is advantageously provided that the flow F2 coming from the secondary chamber 32 passes through the slide valve 2 to reach the mixing chamber 33, whereas the flow F1 coming from the primary chamber 31 directly reaches the mixing chamber 33 without passing through the slide valve 2.

Advantageously, it is envisaged that the slide valve 2 fluidly separates the chambers 31 and 32. In the case illustrated in FIGS. 5 and 6, the slide valve 2 is received at a proximal end of the annular wall 54, so as to close off a proximal opening defined by this wall 54. In other words, the slide valve 2 is axially inserted, at least partially into the tubular shape of the wall 54, for any position of the slide valve 2 along its translational travel. In particular, the slide valve 2 comprises an outer radial edge 55, which surrounds the axis X1 by being centered on the axis X1 and is surrounded by the wall 54 near the proximal end of the wall 54. Preferably, the outer radial edge 55 is carried by a ring of the slide valve 2, which axially connects the side 48 to the side 49. Preferably, the device 1 comprises a seal 56, which is radially interposed between the outer radial edge 55 and the wall 54 to ensure a seal between the chambers 31 and 32. The seal 56 is, for example, in the form of an O-ring received in a peripheral groove formed in the surface of the edge 55.

In summary, chambers 31 and 33 are entirely delimited by the base 11, while chamber 32 is entirely formed by the base 11 and the inner ring 20 of the spacer 13, preferably sealed by the seal 25.

The peripheral wall 17 of the cover 12 is preferably tubular, or bell-shaped, surrounding the axis X1 and being centered on the axis X1. The peripheral wall 17 is preferably in the form of a succession of circular-based cylinders centered on the axis X1 and distributed along the axis X1. As seen, for example, in FIGS. 1, 3 and 4, the wall 17 has the shape of a succession of two cylinders, one of which is optionally fluted on the outside.

In the proximal direction X12, the peripheral wall 17 ends with a proximal edge, which describes a closed contour being centered on the axis X1 to internally delimit the opening 19, of circular shape centered on the axis X1.

In the distal direction X11, the peripheral wall 17 ends in a distal edge 71. The distal edge 71 describes a closed contour about the axis X1, which is centered on the axis X1. Preferably, the distal edge 71 is flat, and forms a crown-shaped surface surrounding the axis X1. The distal edge 71 preferably extends along the assembly plane P34, or between the plane P34 and the plane P20. The peripheral wall 17 extends from the distal edge 71, in the proximal direction X12.

The peripheral wall 17, and in particular the distal edge 71, delimits a distal opening 72 of the cover 12 by surrounding it. The distal opening 72 opens in the distal direction X11. The peripheral wall 17 extends from the distal opening 72, in other words, from the distal edge 71, to the control opening 19, axially connecting them. The proximal compartment 14, radially delimited by the peripheral wall 17, connects the distal opening 72, so as to open from the cover 12 in the distal direction X11, to the control opening 19, so as to open from the cover 12 in the proximal direction X12.

In the present example, a function of the spacer 13 is to close the compartment 14 in the distal direction X11, in other words, to close the cover 12. This closure is not necessarily watertight, especially if the flows F1, F2 and F3 are confined in the compartment as is the case for this example. More generally, the cover 12 is fitted axially against the spacer 13, being in particular pressed against the spacer 13 along the distal direction X11. It may be provided that the distal edge 71 of the cover 12 comes to press against the proximal face 23 of the ring 20, as shown in FIGS. 5 and 6, in particular against a circular rib 73 formed on the surface of the face 23, visible in particular in FIGS. 4, 5 and 6. Alternatively, it may be provided that the edge 71 does not press against the spacer 13 along the direction X11, the edge then being for example axially distant from the proximal face 23.

Externally, the peripheral wall 17 of the cover 12 forms an outer radial surface 74. This outer radial surface 74 is centered on the axis X1, and preferably presents a cylindrical shape with a circular base.

Preferably, each spacer fin 26 presents an inner radial surface 28. Axially, this surface 28 extends from the proximal face 23 of the inner ring 20. This surface 28 extends radially away from the axis X1, being radially turned inward, in other words, facing the axis X1. This surface 28 preferably has a geometry in the form of a portion of a cylinder with a circular base, this cylinder being centered on the axis X1.

More generally, the surface 28 of the fin 26 and the surface 74 of the cover 12 have a complementary shape, so as to be able to come to press radially against each other. Thus, these surfaces 28 and 74 can be referred to as radial positioning surfaces. In practice, the cover 12 and the spacer 13 are positioned coaxially by press-fit reception of the wall 17 of the cover 12 inside the fins 26, in other words, by radial cooperation of the surfaces 28 and 74. In other words, the fins 26 delimit the portions of an opening, which, in the present example, is cylindrical in shape with a circular base centered on the axis X1, for receiving the cover 12, by means of the wall 17. It may be provided that this opening, which the fins 26 delimit by portion, has any other suitable shape, complementary to that of the wall 17 of the cover 12, for example conical. Each fin 26 holds the cover 12 radially outward to keep it centered. The fins 26 thus ensure the alignment, in other words, the relative radial positioning, of the cover 12 and the spacer 13.

As seen in FIGS. 1 to 4, the cover 12 comprises a plurality of fins 75, each fin 75 being referred to as a "cover fin". Each fin 75 is preferably formed integrally with the wall 17. More generally, each fin 75 is fixedly integral with the wall 17, in other words, is fixed relative to the wall 17 by being attached thereto.

Each fin 75 projects radially outward from the wall 17, more particularly from the outer radial surface 74. In other words, the fins 75 are peripheral elements of the cover 12.

Around the axis X1, each cover fin 75 extends over only a portion of the outer radial surface 74, so as to leave a portion of the surface 74 free, between two successive cover fins 75. If more than one fin 75 is provided, they are spaced apart from each other about the axis X1. Two successive fins 75 define between them a free portion 78, referred to as the "outer free portion", about the axis X1. Preferably, the fins 75 are regularly distributed around the axis X1. The present example provides four fins 75. However, a different number of fins 75 may be provided. At a minimum, only one fin 75 is provided.

Preferably, it is provided that each cover fin 75 is formed by two legs 76, which are spaced around the axis X1. Each fin 75 thus provides, between the two legs 76, a free portion 77, called "inner free portion", in other words, for example a radial notch. Each fin with its two legs 76, thus constitutes a clamp, or a fork. In this case, each outer free portion 78 is delimited by one of the legs 76 of a first fin 75 and by one of the legs 76 of a second fin 75, successive to the first fin 75.

Alternatively, it may be provided that only some fins 75 form a clamp, while others are formed by a single leg or present some other structure. Alternatively, no fin 75 forms a clamp.

The cover 12 presses against the proximal edge 34 by means of the fins 75. For this purpose, as seen in FIGS. 1 to 4, each fin 75 presents a distal surface 79, which extends in the assembly plane P34, and is turned in the distal direction X11 to press against a respective portion of the proximal edge 34. Therefore, it is the surfaces 79 that press along the direction X11 against the corresponding portions of the edge 34. When the fin 75 comprises the two legs 76, this surface 79 is distributed over each of the legs 76, and is interrupted at the inner free portion 77. The fins 75 therefore together form an outer radial shoulder for the cover 12, thereby ensuring the positioning of the cover 12 along the direction X11 relative to the base 11. Preferably, each surface 79 extends the distal edge 71 of the cover 12, extending in the same plane P34. In other words, each cover fin 75 extends along the proximal direction X12 from its respective surface 79.

It may be further provided that the cover 12 presses against the proximal face 23 of the spacer ring 20 by means of the fins 75, in particular by means of the distal surfaces 79.

As seen in FIGS. 1 to 4, in order for the fins 26 and 75 to be able to press against the proximal edge 34, it is provided that these fins 26 and 75 are distributed along the edge 34 in succession, in other words, are distributed around the axis X1 in succession. In other words, each fin 26 and 75 presses on a respective portion of the edge 34, which is distinct from the portions of the edge 34 on which the other fins 26 and 75 press. In particular, the fins 26 and 75 alternate about the axis X1. In other words, it is provided that each fin 26 is received in the outer free portion 78 provided between two successive fins 75.

The fact that the fins 26 and 75 are provided in succession about the axis X1 allows the fins 26 and 75 to be housed at the same height along the axis X1, in other words, along the same assembly plane P34. The space required to house the fins 26 and 75 being particularly small, especially along the axis X1, the housing 10 is very compact. Moreover, the assembly of the cover 12 on the spacer 13 is particularly easy, since it is sufficient to slip the peripheral wall 17 into the opening provided by the inner radial surfaces 28 of the fins 26, by orienting the cover 12 and the spacer 13 so that the fins 26 are received in the outer free portions 78 provided between the fins 75.

Depending on the situation, it may be provided that the spacer 13 is first assembled on the base 11 to form a lower assembly, then the cover 12 is added to this lower assembly to obtain the housing 10, or that the cover 12 is first assembled to the spacer 13 to form an upper assembly, then the base 11 is added to this upper assembly to obtain the housing 10.

In addition, it is advantageously provided that the cover 12 and the spacer 13 are rotationally locked relative to each other, or at least positioned in rotation, by anti-rotational cooperation of the fins 26 with the fins 75. For this purpose, each fin 26 is interposed between two successive fins 75.

In particular, each fin 26 is pressed, in rotation along a direct direction S29 about the axis X1, against the first fin 75 bordering the outer free portion 78 in which this fin 26 is received, while this same fin 26 is pressed, in rotation along an indirect direction S30 opposite the direct direction S29, against the second fin 75 bordering this same free portion 78. These elements are anti-rotation elements about the axis X1, since the cover 12 is prevented from rotating about the axis X1 relative to the spacer 13 by lateral cooperation of the fins 26 with the fins 75.

In particular, each fin 26 presents a lateral surface 29 and a lateral surface 30, which delimit the fin 26 about the axis X1. The lateral surface 29 constitutes the end of the fin 26 in the direction S29 about the axis X1. The lateral surface 30 constitutes the end of the fin 26 in the direction S30 about the axis X1. Each fin 75 presents a lateral surface 80, which delimits the fin 75 in the direction S29 forming one of its ends about the axis X1. Each fin 75 presents a lateral surface 81, which delimits the fin 75 in the direction S30 forming one of its ends around the axis X1. When the fin 75 forms the two legs 76, one of the legs 76 forms the surface 80 while the other forms the surface 81. By "lateral surface" is meant a surface that is oriented in an anti-rotational direction about the axis X1, for example along a plane comprising the axis X1, or slightly inclined relative to the axis X1. Regardless of the orientation of the lateral surfaces, they have an anti-rotational orientation about the X1 axis.

As shown in FIGS. 1 to 4, the lateral surface 30 of the fin 26 is pressed in the direction S30 against the lateral surface 80 of the first fin 75 and the lateral surface 29 is pressed in the direction S29 against the lateral surface 81 of the second fin 75, successive to the first fin 75, so that a relative immobilization in rotation of the cover 12 and the spacer 13 is achieved.

Figure 3:
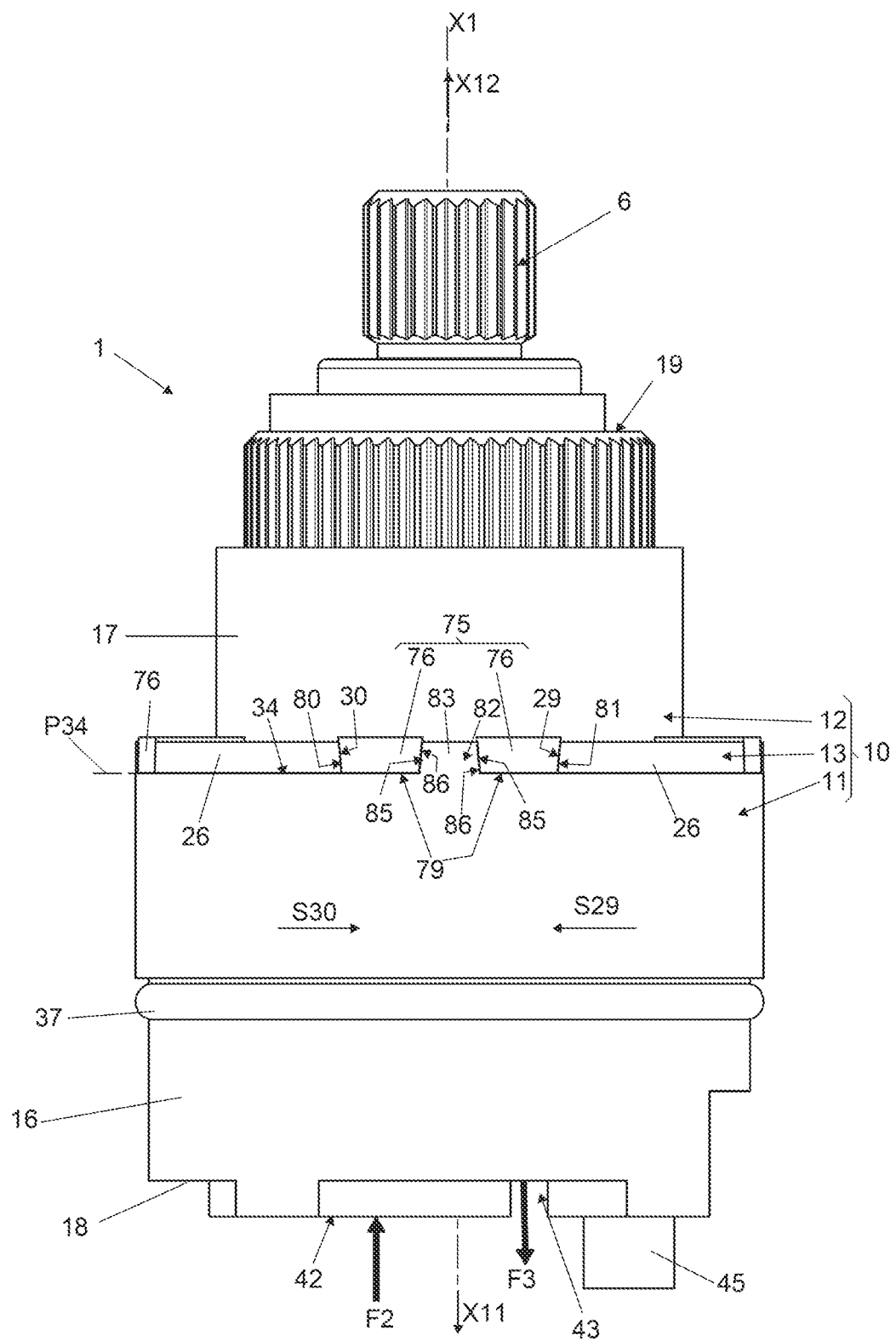
FIG. 3 is a radial view of the device of FIGS. 1 and 2.

As is clearly visible in FIG. 3, it is preferably provided that the lateral surfaces 30 and 80 are obliquely oriented and/or that the lateral surfaces 29 and 81 are obliquely oriented. By "obliquely" oriented, it is meant, for example, that the surfaces are oriented in a slightly helical manner about the axis X1, for example by a few degrees, rather than being oriented strictly in a plane parallel to the axis X1. In particular, it can be provided that, for a same fin 26, the surfaces 29 and 30 are oblique by being divergent along the distal direction X11, whereas, for a same fin 75, the surfaces 80 and 81 are convergent. In other words, preferably, the lateral surfaces 29 and 30 are slightly turned in the proximal direction X12, while the lateral surfaces 80 and 81 are slightly turned in the distal direction X11. Thus, by pressing the cover 12 against the spacer 13 in the distal direction X11, a wedging of each fin 26 between two fins 75 is obtained, by cooperation of the lateral surfaces 29 and 30 respectively with the lateral surfaces 81 and 80. More precisely, when the cover 12 is pressed against the spacer 13 along the distal direction X11, the surface 80 of the fin 75 presses against the surface 30 of the fin 26 along the direction S29, while the surface 81 of the fin 75 presses against the surface 29 of the fin 26. Indeed, the application of a force on the cover 12, relative to the spacer 13, along the distal direction X11, generates, by angle transmission, an orthoradial force component, in the direction S29, at the level of the oblique contact between the surface 29 and the surface 81, and an orthoradial force component in the direction S30, at the level of the oblique contact between the surface 30 and the surface 80. Thus, pressing the cover 12 against the spacer 13 in the distal direction X11 results in an adjustment of the rotational clearances between the cover 12 and the spacer 13 about the axis X1.

Alternatively, a reverse arrangement to the above is provided, according to which, the surfaces 29 and 30 are convergent and surfaces 80 and 81 are divergent, so that the clearance adjustment is accomplished by pressing the spacer 13 in the distal direction X11 against the cover 12, via surfaces 29, 30, 80 and 81.

As seen in FIGS. 1 to 4, the base 11 comprises a plurality of teeth 82 and 87. Each tooth 82 and 87 projects from the proximal edge 34 of the base 11, in the proximal direction X12, occupying only a portion of the proximal edge 34. Each tooth 82 and 87 is preferably formed integrally with the wall 16 and the proximal edge 34. More generally, each tooth 82 and 87 is fixedly integral with the edge 34 and the wall 16, in other words, is fixed relative to the wall 16 by being attached thereto. If more than one tooth is provided, they are spaced apart from each other about the axis X1. Preferably, the teeth 82 and 87 are evenly spaced about the axis X1. The present example provides four teeth, namely two teeth 82 and two teeth 87. Preferably, the same number of teeth is provided as fins 75 and/or fins 26. However, a different number of teeth may be provided. At a minimum, only one tooth is provided.

Preferably, the proximal edge 34 is furthermore, for preference, entirely flat along the plane P34, while each tooth 82 and 87 extends in the proximal direction X12 relative to the plane P34. The fins 26 and 75 are received on the portions of the proximal edge 34 lacking the teeth 82 or 87. Thus, the fins 26 and 75 and the teeth are distributed about the axis X1 in succession about the axis X1, or even alternating about the axis X1. This succession in the same plane P34 of the teeth and fins 26 and 75 represents a significant space saving for the assembly of the housing 10, particularly along the axis X1.

Preferably, each tooth 82 is provided as a "single tooth", formed by a single leg 83. In the present example, two of the teeth are single teeth 82. Preferably it is provided that each tooth 87 is a "double tooth", formed by two legs 84, which are spaced about the axis X1. Each double tooth 87 thus provides, between the two legs 84, a free portion. In the present example, an alternation of single teeth 82 and double teeth 87, about the axis X1, is provided. Each tooth 87 with two legs 84 therefore constitutes a clamp or a fork. Alternatively, only single teeth 87, or only double teeth 82 may be provided.

The main function of the single teeth 82 is to block in rotation the cover 12 and/or the spacer 13 in rotation relative to the base 11, each single tooth 82 being in anti-rotational support against the fins 26 and 75 about the axis X1. For example, each single tooth 82 is in anti-rotational support either against one or more spacer fins 26, or against one or more cover fins 75, or by being interposed between a spacer fin 26 and a cover fin 75.

To this end, each single tooth 82 presents two lateral surfaces 85, one of the surfaces 85 being turned in the direction S29 and the other according to the direction S30, to press against the complementary lateral surfaces of the fins 26 and/or 75. The lateral surfaces 85 delimit the tooth 82 about the axis X1.

As shown in FIGS. 1 to 4, it is advantageously provided that each single tooth 82 presses anti-rotationally about the axis X1 only against a respective cover fin 75. For this purpose, while the cover fin 75 presents the form of a clamp with two legs 76, the single tooth 82 is received in the internal free portion 77 provided between these two legs 76. In this case, as many two-legged fins 75 as single teeth 82 are provided.

More precisely, it is advantageously provided that each fin 75 pressing anti-rotationally against a tooth 82 presents two inner lateral surfaces 86, one facing in the direction S29 and the other facing in the direction S30. Each inner lateral surface 86 is formed on one of the two legs 76 of the fin 75, so as to face each other. The surfaces 86 thus delimit between them the inner free portion 77 of the fin 75 about the axis X1.

By means of its surface 85 turned in the direct direction S29, the single tooth 82 presses, in rotation along the direct direction S29 about the axis X1, against the surface 86 of the first leg 76 of the fin 75. This surface 86 is turned in the indirect direction S30. By means of its surface 85, turned in the indirect direction S30, the single tooth 82 presses, in rotation along the indirect direction S30 about the axis X1, against the surface 86 of the second leg 76 of the fin 75, the surface 86 of which is turned in the direct direction S29. In other words, the single tooth 82 is interposed in rotation between the two legs 76 of the fin about the axis X1. These supports are anti-rotation supports about the axis X1, since the cover 12 is prevented from rotating about the axis X1 relative to the base 11 by lateral cooperation of the fins 26 with the single teeth 82.

As is clearly visible in FIG. 3, it is preferably provided that the lateral surfaces 85 and 86 are obliquely oriented, similarly to the surfaces 29, 30, 80 and 81. In particular, it may be provided that, for a same tooth 82, the surfaces 85 are oblique while being divergent along the distal direction X11, and that, for a same fin 75, the surfaces 86 are divergent. Preferably, this arrangement is provided if the surfaces 80 and 81 are themselves convergent along the distal direction X11. Thus, by pressing the cover 12 against the base 11 in the distal direction X11, a wedging of each single tooth 82 is obtained between the legs 76 of the fin 75, by cooperation of the lateral surfaces 85 and 86. Specifically, when the cover 12 is pressed against the base 11 along the distal direction X11, the surface 86 of the fin 75 that faces in the direction S29 presses against the corresponding surface 85 in the direction S29. Similarly, the surface 86 facing in the direction S30 presses in the direction S30 against the corresponding surface 85. Indeed, the application of a force on the cover 12 relative to the base 11, along the distal direction X11, generates, by angle transmission, orthoradial force components so that the single tooth 82 is compressed between the two legs 76. Thus, a pressing of the cover 12 against the spacer 13 in the distal direction X11 results in an adjustment of the rotational clearances between the cover 12 and the base 11 about the axis X1.

Alternatively, instead of the oblique lateral surfaces of one or more of the cover fins, oblique lateral surfaces of one or more of the spacer fins could be provided to press against the surfaces 85 of the single tooth 82. Alternatively, it could be provided that, for each tooth 82, one of the surfaces 85 comes into contact with an oblique lateral surface of one of the spacer fins, while the other surface 85 comes into contact with an oblique lateral surface of one of the cover fins.

More generally, the cooperation of the oblique surfaces of the fins and teeth advantageously results in a clamping in rotation about the axis X1 of the cover 12, the spacer 13 and the base 11.

Optionally, the single teeth 82 may have the function of positioning the spacer 13 and/or the cover 12 relative to the base 11, so that these elements of the housing 10 are coaxial with the axis X1. For this purpose, it may, for example, be provided that the single teeth 82 axially extend the inner radial surface 36 of the base 11, and receive between them a complementary outer radial surface of the spacer 13 and/or the cover 12.

The assembly of the cover 12 on the base 11, or of the spacer 13 on the base 11, or of an assembly constituted by the spacer 13 and the cover 12 on the base 11, is particularly easy to carry out, since it is sufficient to slip the fins 26 and 75 between the teeth 82 and 87, which ensures a correct relative axial and rotational positioning of the cover 12, of the spacer 13 and of the base 11.

As previously explained, pressing the cover 12 against the base 11 along the direction X11 advantageously presses the spacer 13 against the base 11. Alternatively, pressing the spacer 13 against the base 11 along the direction X11 presses the cover against the base 11. To this end, as shown in FIGS. 5 and 6, the valve system advantageously comprises a ring 65 for pressing the housing 10 against the bottom wall 62 in the distal direction X11, preferably by means of the cover 12 or the spacer 13. This support thus results in mutual axial support of the cover 12, the spacer 13 and the base 11.

The ring 65 is coaxial with the axis X1 when the housing 10 is coupled to the socket 60. The ring 65 surrounds the cover 12, for example, so as to come to press axially along the distal direction X11 against the housing 10. Here, it is provided that the ring 65 comes to press against the cover 12, for example by means of an external shoulder of the peripheral wall 17 turned in the proximal direction X12. Consequently the cover 12 comes to press against the spacer 13, by means of the oblique lateral surfaces 29, 30, 80 and 81 of the fins 26 and 75 and by means of the distal edge 71 against the proximal face 23. The cover 12 comes to press on the proximal edge 34 of the base 11, by means of the fins 75. This presses the spacer 13 against the edge 34 of the base 11, by means of the fins 26. In order to achieve this support, the ring 65 is, for example, screwed to the recess 64. For this purpose, the ring 65 comprises, for example, an external thread 66, which is screwed into an internal thread 67 of the recess 64, carried for example by the wall 61.

More generally, it is provided that the base 11, the cover 12 and the spacer 13 are held together by interposition of the housing 10 between two antagonistic axial forces, one being applied along the proximal direction X12 against the base 11, here by the wall 62 of the socket 60, the other being applied along the distal direction X11 against the cover 12, here by the ring 65. Alternatively, provision could be made for the second force to be applied against the spacer 13 rather than against the cover 12, by providing for an appropriate reversal of the orientation of the oblique lateral surfaces on the fins 26 and 75.

Preferably, the device 1 comprises a fastener for holding the cover 12 and the base 11 together, even when the housing 10 is not held together by the ring 65. For this purpose, it is provided that the fastener holds the base 11 relative to the cover 12 along the distal direction X11. Preferably, one part of this fastener is formed by the cover 12 and the other part is formed by the base 11. For example, it is provided that the fastener is formed by a system of snap-fastening of the cover 12 onto the base 11 along the axis X1, this snap-fastening system being strained when the base 11 is moved axially away from the cover 12, and being released when the cover 12 is brought into axial abutment against the base 11, for example by means of the ring 65.

In the present example, one part of the fastener is formed by two of the teeth, in particular by the two legs 84 of the two double teeth 87, while the other part of the fastener is formed by two of the fins 75, in particular by the two legs 76 of these two fins 75. The fact of forming the fastener directly by the fins 75 and the double teeth 87 allows in particular to save space. Alternatively, it could be provided that more or fewer fins and associated teeth participate in forming the fastener. Alternatively, it could be provided that the fastener is formed by other elements of the cover 12 and the base 11.

Figure 4:
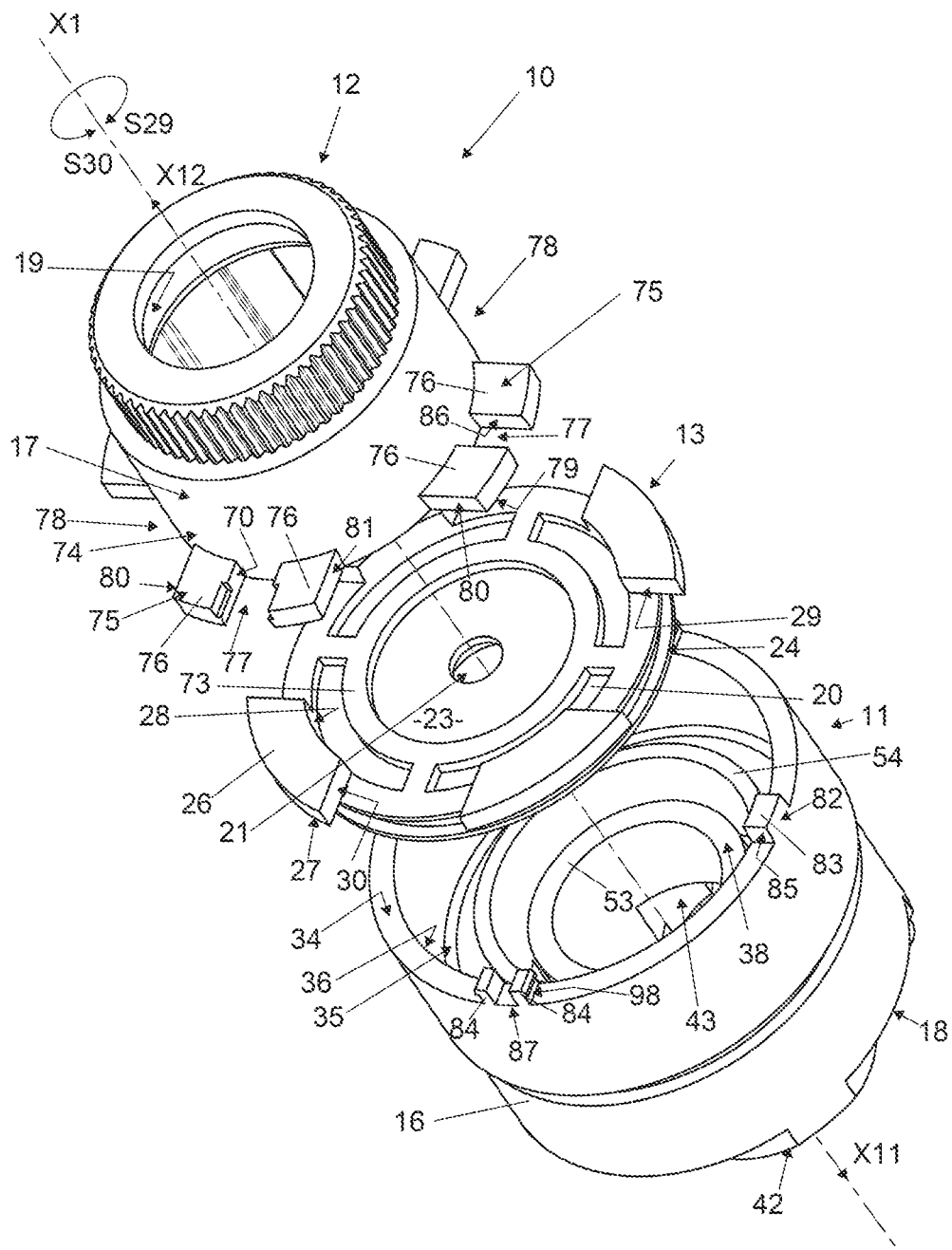
FIG. 4 is an exploded perspective view of a housing belonging to the device of FIGS. 1 to 3.

For example, as shown in FIGS. 1 and 4, the two legs 84 of the double teeth 87 present, at their respective ends along the direction X12, snap hooks, which, for example, project from the lateral surfaces 98 of the double teeth 87. In a complementary manner, the two corresponding legs 76 present, at their respective ends along the direction X11 snap hooks, which project from, for example, the inner lateral surfaces 70 of these legs 76. For the assembly of the cover 12 with the base 11, the legs 84 and/or the legs 76, carrying the snap hooks, are capable of deforming so that said snap hooks cross each other in order to snap into place, when the cover 12 is brought axially closer to the base 11 to the assembled position. Once the system snapped together, the cover 12 is moved axially away from the base 11 in the proximal direction X12, the snap-in system is strained in that the snap hooks of the leg 84 engage in the distal direction X11 against the snap hooks of the leg 76 to hold the base 11 attached to the cover 12. However, when the cover 12 is axially pressed against the base 11 along the distal direction X12, the snap-in system is not strained, in that the snap hooks of the leg 76 are axially remote from the snap hooks of the leg 84. Alternatively, it may be provided that the snap-in system is strained whether or not the cover 12 and the base 11 are axially pressing against each other.

In the illustrated example, when the snap-in system is engaged, or more generally when the cover 12 and the base 11 are axially attached by the fastener, the spacer 13 is axially captured between the cover 12 and the base 11, so that the housing 10 is fully held together.

In the present example, the control 3 comprises a thermostatic actuator 4 and a control member 6.

The position of the slide valve 2 in translation is determined, on the one hand, by the position of the control member 6, which is actuated, once the valve system is installed, by an end user or by an actuator external to the device 1, and depending, on the other hand, on the configuration of the thermostatic actuator 4, in order to carry out a thermal regulation of the position of the slide valve 2. Alternatively, it could be provided that the control 3 is devoid of the thermostatic actuator 4, so that the position of the slide valve 2 depends entirely on the control member 6, or that the control 3 is devoid of the control member 6, so that the position of the slide valve 2 depends entirely on the thermostatic actuator 4.

Preferably, the thermostatic actuator 4 is contained partly within the compartment 14, in other words, in the cover 12, and partly in the compartment 15, in other words, in the base 11, and passes through the ring 20 by means of the opening 21.

The thermostatic actuator 4 comprises a primary part 88 and a secondary part 89. Preferably, the primary part 88 forms a distal end of the thermostatic actuator 4, while the secondary part 89 forms a proximal end of the thermostatic actuator 4. Here, the thermostatic actuator 4 is coaxial with the axis X1, so that the axis X1 passes through the parts 88 and 89 in succession. Depending on the temperature, the thermostatic actuator 4 has a driving action, which moves in translation the part 89 relative to the part 88 along the axis X1. In particular, when the temperature applied to the primary portion 88 increases, the secondary part 89 moves in translation in the proximal direction X12 relative to the primary part 88. When the temperature decreases, the secondary part 89 moves in translation, or is allowed to move in translation, in the distal direction X11 relative to the primary part 88.

As illustrated, the thermostatic actuator 4 is for example a thermostatic element in the form of a cup. In this case, the primary part 88 forms, for example, a thermosensitive cup, comprising a metal housing, presenting an opening, and a thermally expandable material contained within the metal housing. In this case, the secondary part 89 forms, for example, a rod parallel or coaxial with the axis X1, which is partly in the metal housing and which projects outward from the metal housing, being supported by the opening, so as to be slidable along the axis X1 relative to the metal housing. When its temperature increases, the thermo-expandable material expands and pushes the rod in the direction X12. When its temperature decreases, the thermo-expandable material retracts and allows a movement in translation of the rod in the direction X11.

Alternatively, it could be provided that the thermostatic actuator 4 is a shape memory alloy part, where the primary part is formed by a distal portion of the shape memory alloy part and where the secondary part is formed by a proximal portion of the shape memory alloy part.

It is provided that the thermostatic actuator 4 may move in translation relative to the housing 10 along the X1 axis, preferably by means of the primary part 88.

The thermostatic actuator 4 preferably passes through the inner ring 20 by means of the central opening 21. Here, a proximal end of the primary part 88 is received in the opening 21. Advantageously, it is provided that the opening 21 is closed by the thermostatic actuator 4, here by the primary part 88, so that the flows F1, F2 and F3 circulating in the mixing compartment 15 cannot leak toward the control compartment 14. To ensure the sealing of this closure, the device 1 advantageously comprises a dynamic seal 92, such as a seal, carried by the opening 21.

A distal end of the primary part 88 is received in the base 11, in other words, in the mixing compartment 15, so as to be immersed in one of the flows F1, F2 or F3 and to be able to react depending on the temperature of this flow. Here, the bulk of the primary part 88 is immersed in the flow F3, starting from its distal end. The distal end of the primary part 88 is preferentially received in the mixing chamber 33. The relative position of parts 88 and 89 is therefore dependent on the temperature of the flow F3. Preferably, the primary part 88 passes through the two seats 38 and 39, being surrounded by these seats 38 and 39.

In the present example, it is intended that the slide valve 2 and the primary part 88 are fixed relative to each other, at least for movement in translation along the axis X1. In the present example, the slide valve 2 is fixed to the primary part 88 by being screwed to the primary part. As illustrated, the primary part 88 passes through, for example, a central opening 91 of the slide valve 2, which is centered on the axis X1 and through which the slide valve 2 is fixed to the primary part 88. The position of the slide valve 2 relative to the housing 10 therefore corresponds to the position of the primary part 88.

Preferably, the control 3 comprises a return spring 90, which applies an elastic force to the primary part 88 relative to the housing 10 in the proximal direction X12. For example, the return spring 90 is a compression spring that is axially interposed between the primary part 88, for example via a shoulder carried by the primary part 88, and the bottom 18 of the base 11. The return spring 90 has the function of bringing the parts 88 and 89 back toward each other along the axis X1 when the temperature of the flow F3 drops, by making the thermostatic actuator 4 press in the direction X12 against the rest of the control 3, as explained below.

A proximal end of the secondary part 89 extends into the cover 12, in other words, into the compartment 15.

Preferably, the control member 6 passes through the control opening 19, so that a distal end of the control member 6 is contained within the compartment 14, in other words, within the cover 12, while a proximal end of the control member 6 projects from the housing to be actuated by the end user or to be mechanically connected to the external actuator.

Alternatively, it is provided that the control member 6 is entirely contained within the compartment 14, being accessible from outside the housing 10 by means of the opening 19.

Here, the control member 6 is pivotable relative to the housing 10, about the axis X1. For example, the opening 19 supports this rotation. The member 6 therefore constitutes a control button. Instead, it could be provided that the control member forms a lever or any other control handle.

The control member 6 actuates the secondary part 89 in translation, if necessary by means of a mechanical transmission 7 and an overtravel compensation system 5 belonging to the control 3.

The mechanical transmission 7 has the function of converting, if necessary, the movement of the member 6 into a translation of the primary part 88. The mechanical transmission 7 is entirely contained in the cover 12.

Here, since the member 6 is pivotable about the axis X1 relative to the housing 10, it is provided, for example, that the transmission 7 is in the form of a helical connection. To this end, the transmission 7 includes, for example, a slide 94, an external thread 93 formed directly at the distal end of the member 6, and an anti-rotation guide 99, formed directly by an internal radial surface of the peripheral wall 17 of the cover 12. The slider 94 presents in the form of an annular part centered on the axis X1, which, by cooperation with the guide 99, can move in translation along the axis X1 relative to the housing 10, while being prevented from rotating about the axis X1 relative to the housing. For this purpose, the slide 94 presents, for example, external radial grooves, parallel to the axis X1, which cooperate mechanically with the guide 99, forming internal radial grooves, parallel to the axis X1. The slide 94 also presents an internal thread that cooperates in a helical connection with the thread 93 of the member 6. The rotation of the member 6 relative to the housing 10 about the axis X1 then causes a movement in translation of the slide 94 along the axis X1 relative to the housing 10. The thread 93 is advantageously configured so that the connection is irreversible, so that a translational actuation of the slide 94 cannot cause the control member 6 to rotate.

When the thermostatic actuator 4 is provided, the control 3 advantageously comprises the above-mentioned overtravel compensation system 5. Consequently, it is advantageously provided that the slide 94 actuates the slide valve 2 by means of the system and the thermostatic actuator 4. Preferably, this system 5 is entirely received in the control compartment 14, in other words, in the cover 12.

The system 5 is provided for the eventuality that the thermostatic actuator 4 goes into an overtravel situation, in order to protect the integrity of the device 1, for example in case of a sudden and/or significant increase in the temperature of the flow F3. In an overtravel situation, the primary part 88 of the thermostatic actuator 4 is brought to press against the housing 10 in the distal direction X11, by bringing the slide valve 2 to press against the distal seat 38, while the thermostatic actuator generates a force that continues to displace the secondary part 89 in the direction X12 relative to the primary part 88.

The thermostatic actuator 4 is held against the system 5 along the proximal direction X12 by the return spring 90. For this purpose, the secondary part 89 presses against the system 5 in the direction X12. The system 5 is held against the slide 94 along the proximal direction X12 by the return spring 90 by means of the thermostatic actuator 4. In the present example, the system 5 comprises a proximal plunger 96, by means of which the system 5 is held against the slider 94, a distal plunger 97, by means of which the thermostatic actuator 4 is held against the system 5, and an overtravel spring 95, which applies an axial elastic force on the proximal plunger 96, relative to the distal plunger 97. The distal plunger 97 can be moved in translation along the axis X1 relative to the proximal plunger 96. The elastic force exerted by the spring 95 opposes the displacement of the distal plunger 97 in the direction X12 relative to the proximal plunger 96, exerting a force in the direction X11.

In the present example, for reasons of compactness, the proximal plunger 96 presents the form of a sleeve centered on the axis X1, which entirely contains the spring 95. The proximal plunger 96 comprises an outer radial shoulder formed at a distal end of the sleeve, by means of which the proximal plunger 96 is axially held against the slide 94. The spring 95 is a compression spring, which, is held along direction X12, against an inner radial shoulder of the proximal plunger 96, formed at a proximal end of the sleeve. The distal plunger 97 slides inside the sleeve. A distal end of the spring 95 presses against the distal plunger 97 in the direction X11, while the secondary part 89 presses against the distal plunger 97 in the X12 direction.

In a basic configuration of the system 5, which is obtained when the thermostatic actuator 4 is not in the overtravel situation, the plunger 97 is held in a distal position relative to the plunger 96 under the action of the spring 95, for example against an inner radial shoulder of the plunger 96 formed at the distal end of the sleeve. Then, everything happens as if the secondary part 89 was directly held against the slide 94 along the direction X12, the system 5 rigidly transmitting the axial position of the slide 94 to the secondary part 89 of the thermostatic actuator 4. To this end, the springs 90 and 95 are configured so that the elastic force exerted by the overtravel spring 95 is higher than that exerted by the return spring 90, in order to prevent the return spring 90 from being able to overcome the force of the overtravel spring 95 and displace the plunger 97 in the direction X12 relative to the slider 94, when the thermostatic actuator 4 is not in an overtravel situation.

In an overtravel configuration of the system 5, which is obtained when the thermostatic actuator 4 is in the overtravel situation, the plunger 97 moves in translation in the direction X12 relative to its distal position, against the spring 95, under the effect of the force directed according to the direction X12 produced by the thermostatic actuator 4 and transmitted to the plunger 97 by the secondary part 89, while the thermostatic actuator 4 presses against the housing 10 in the direction X11, by bringing the slide valve 2 into the distal position against the seat 38.

Alternatively, if no overtravel compensation system 5 is provided, it may be provided that the slide 94 is directly integral with the secondary part 89 of the thermostatic actuator 4 for the axial translation, in order to actuate the slide valve 2 by means of the thermostatic actuator 4. If no thermostatic actuator is provided, it can be provided that the slide 94 is directly integral with the slide valve 2, for the axial translation.

In operation, the slide valve 2 can be displaced by acting on the member 6, to adjust the proportion of the mixture of the flows F1 and F2 in the formation of the flow F3. The translational position of the slide valve 2 depends on the position of the control member 6, the position of the control member 6 being transmitted to the slide valve 2 by means of the transmission 7, of the system 5 and the thermostatic actuator 4.

Depending on the temperature of the flow F3, the thermostatic actuator 4 effects a correction of the position of the slide valve 2, because the parts 88 and 89 move one relative to the other along the axis X1 as a function of the temperature of the flow F3, and therefore the part 88 is moved in translation relative to the slide 94, displacing the slide valve 2 accordingly.

The embodiment illustrated in FIGS. 7 and 8 relates to a device identical to that of FIGS. 1 to 6, except for the differences set forth below.

Figure 7:
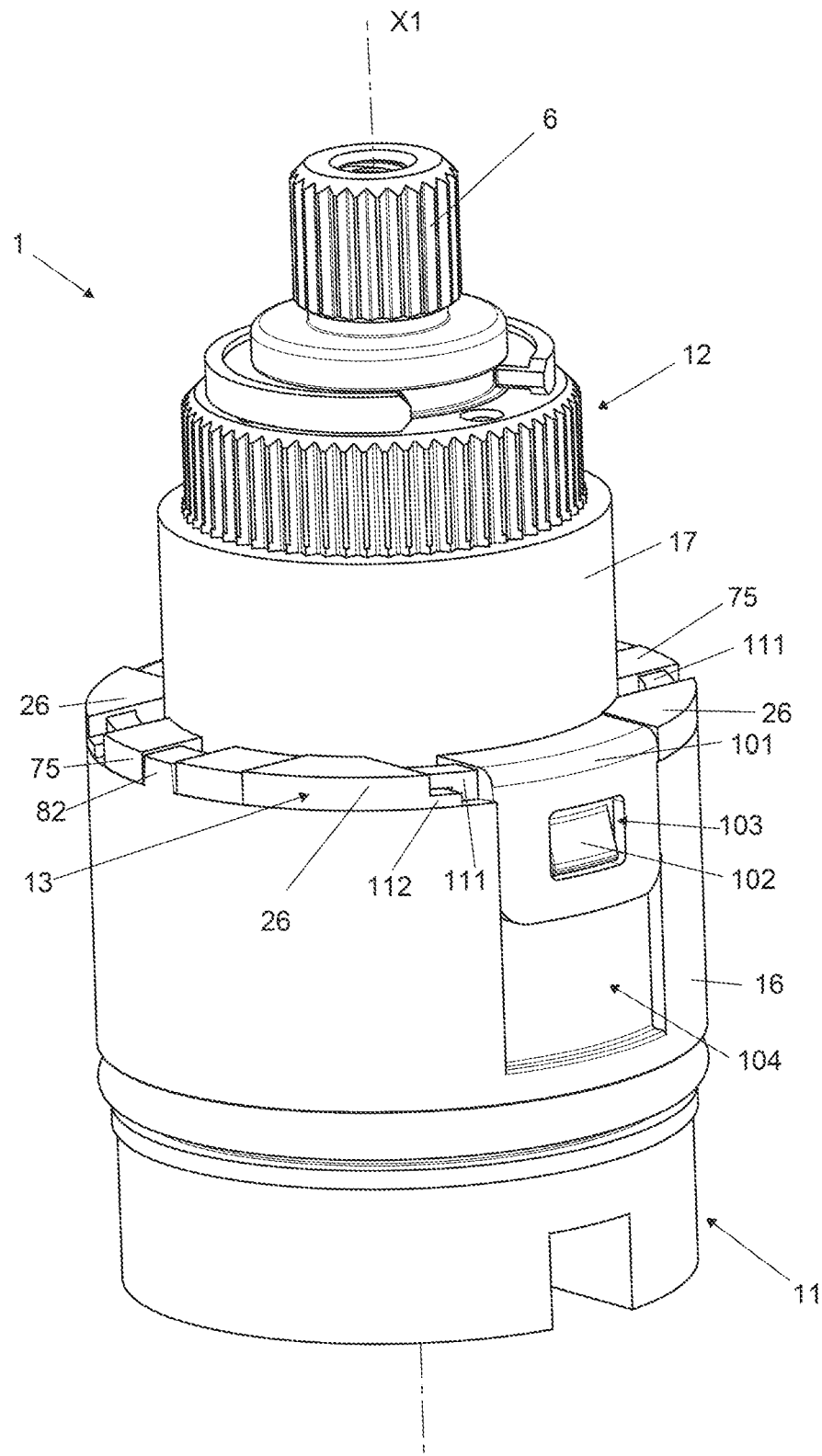
FIG. 7 is a perspective view of a device according to a second embodiment in accordance with the invention.
Figure 8:
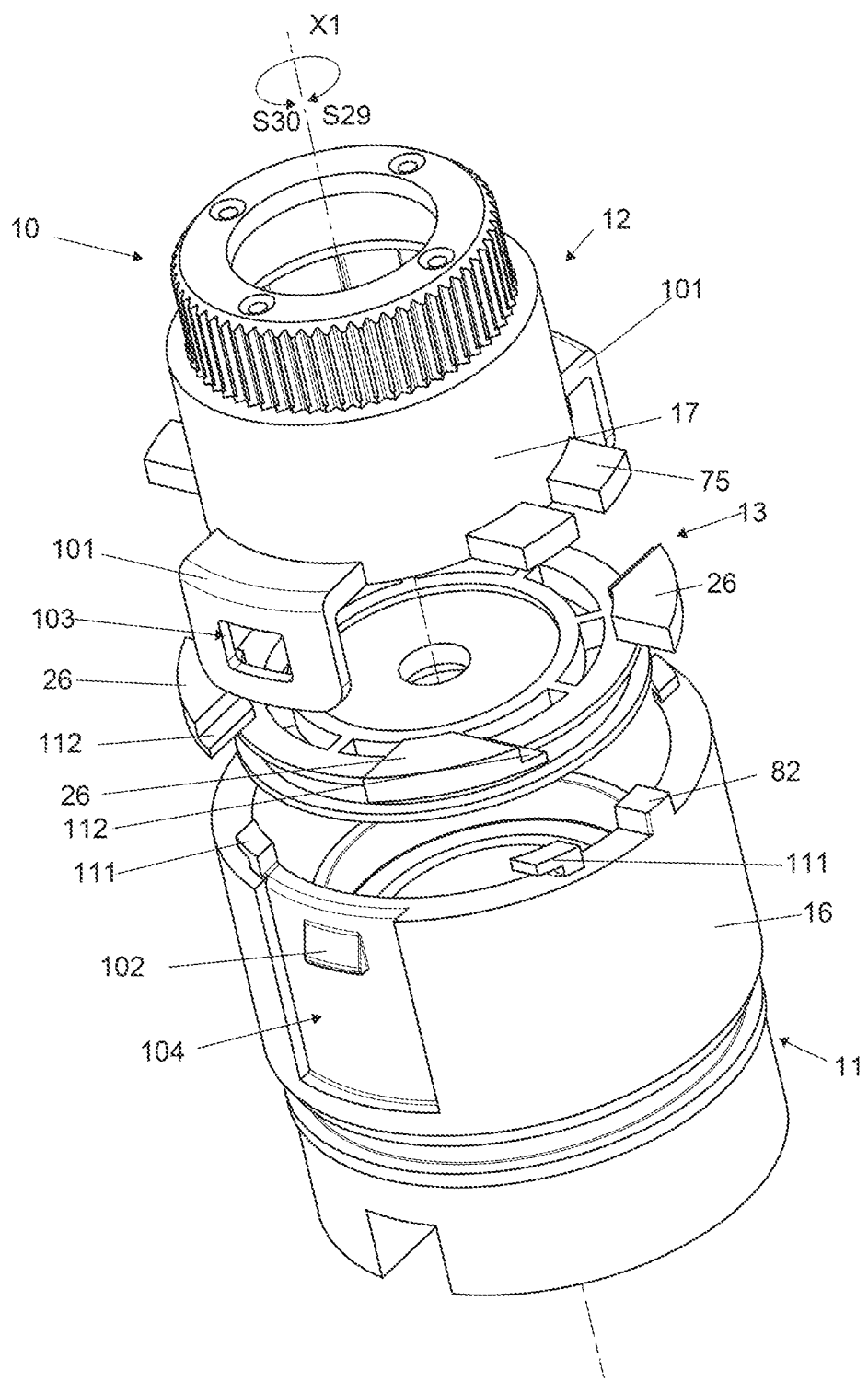
FIG. 8 is an exploded perspective view of a housing belonging to the device of FIG. 7.

For this embodiment in FIGS. 7 and 8, the base 11 comprises only single teeth 82, in other words, with a single leg 83, for example, two in number. The base 11 comprises only two fins 75, each fin 75 receiving one of the two teeth 82 in its inner free portion 77. The fins 75 and the teeth 82 are devoid of any snap-in means and therefore do not form an axial attachment to axially retain the cover 12 relative to the base 11.

For this embodiment of FIGS. 7 and 8, a fastener is nevertheless formed by the base 11 and the cover 12. The fastener forms a snap-in system, which includes the lugs 101 and the snap-in stops 102.

The lugs 101 are formed by the cover 12, in one piece with the rest of the cover 12. The lugs 101 are, for example, two in number and are evenly distributed about the axis X1. The lugs 101 are, for example, attached to the peripheral wall 17, near the distal edge 71. A distal end of each lug 101 extends in the distal direction X11 along the peripheral wall 16 of the base, so as to cover a respective radial outer portion 104 of this peripheral wall 16. Each portion 104 is radially recessed inward to at least partially accommodate the lug 101. Each snap-in stop 102 is formed on the surface of the peripheral wall 16, within one of the portions 104 covered by the respective lug 101. Preferably, each snap-in stop 102 is received in a respective snap-in opening 103 in the corresponding lug 101. By cooperation of the stops 102 with the openings 103, the cover 12 is retained relative to the base 11 in the proximal direction X12.

For this embodiment of FIGS. 7 and 8, the device 1 comprises a fastener which is formed by the base 11 and the spacer 13, by means of which the spacer 13 is attached to the base 11, so that the base 11 is retained relative to the spacer 13 in the distal direction X11. This has the advantage that the spacer 13 and the base 11 are held together, even if the cover 12 is not yet assembled, which is particularly convenient during the manufacture of the device 1. Advantageously, this fastener is provided when it is planned to first assemble the base 11 with the spacer 13 and then the cover 12.

Preferably, this fastener constitutes a hooking system. This fastener comprises, for example, hooks 111, which are formed by the base 11, and complementary notches 112, which are formed by the spacer 13. For example, four hooks 111 and four corresponding notches 112 are provided. The hooks 111 may be hooked to the notches 112 to attach the base 11 to the spacer 13. As illustrated, the hooks 111 are advantageously provided projecting from the proximal edge 34, while the notches 112 are formed by the fins 26, in particular at the lateral surface 30 of the fins 26. Preferably, the hooks 111 and the notches 112 have an antagonistic orthoradial orientation, in that the hooks 111 are, for example, open in the direction S30 and the notches 112 are, for example, open in the direction S29. Consequently, in order to hook the base 11 to the spacer 13, the ring 20 of the spacer 13 is first axially inserted into the proximal opening 35 of the base 11. During this insertion, it is ensured that the spacer 13 is in an assembly orientation relative to the base 11 about the axis X1. In this assembly orientation, the spacer 13 is offset in the direction S29 relative to its final position about the axis X1. The spacer 13 is then rotated relative to the base 11 in the direction S30, to move the spacer from the assembly orientation to the final orientation and thus engage the hooks 111 and notches 112 with each other orthoradially. The spacer 13 is then attached to the base 11 by cooperation of the hooks 111 and the notches 112.

Alternatively, it may be provided that the attachment of the base 11 with the spacer 13 includes snap-in lugs, rather than the aforementioned hooking system.

The embodiment illustrated in FIGS. 9 and 10 relates to a device identical to that of FIGS. 1 to 6, except for the differences set out below.

Figure 9:
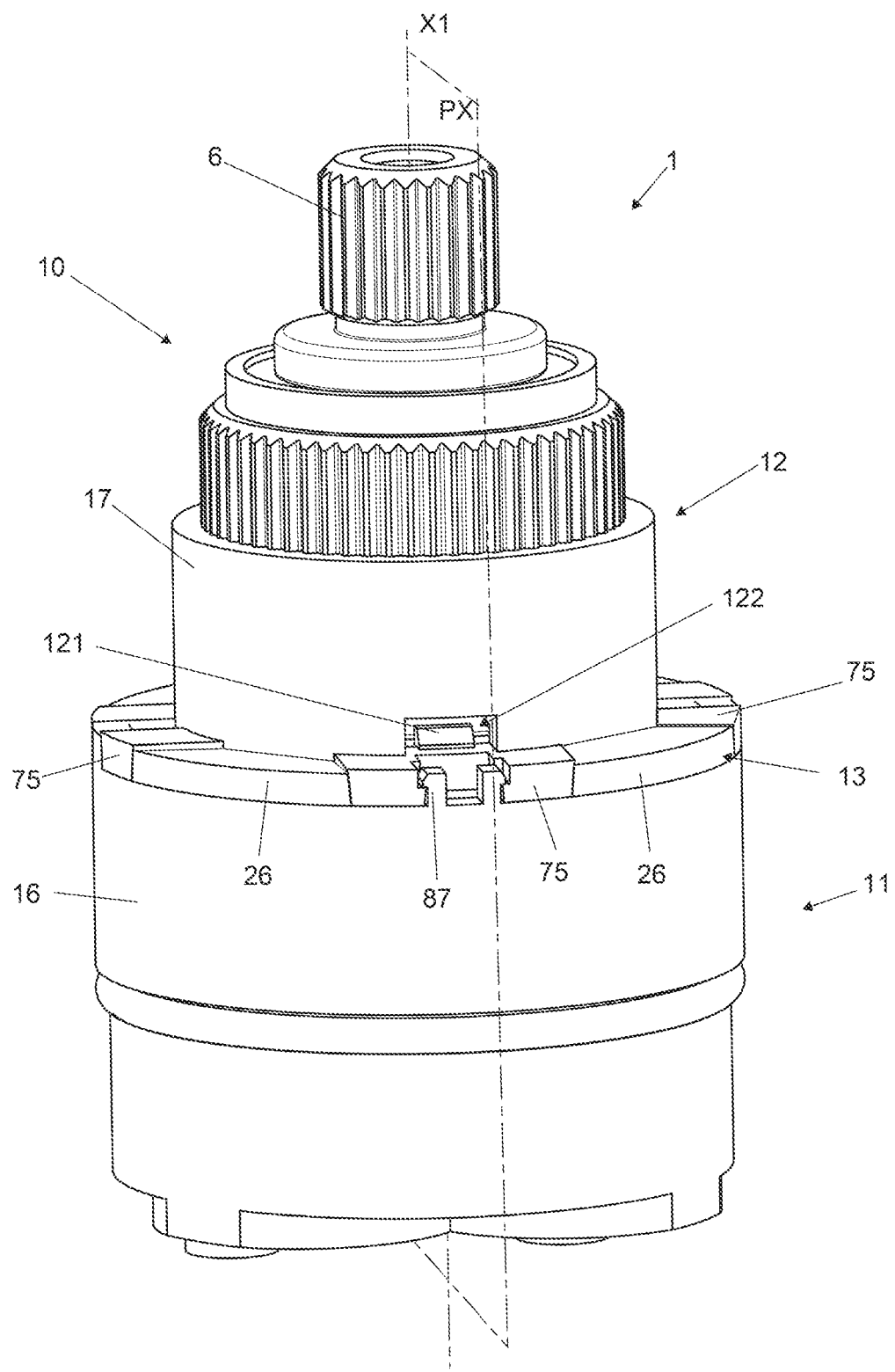
FIG. 9 is a perspective view of a device according to a third embodiment in accordance with the invention.
Figure 10:
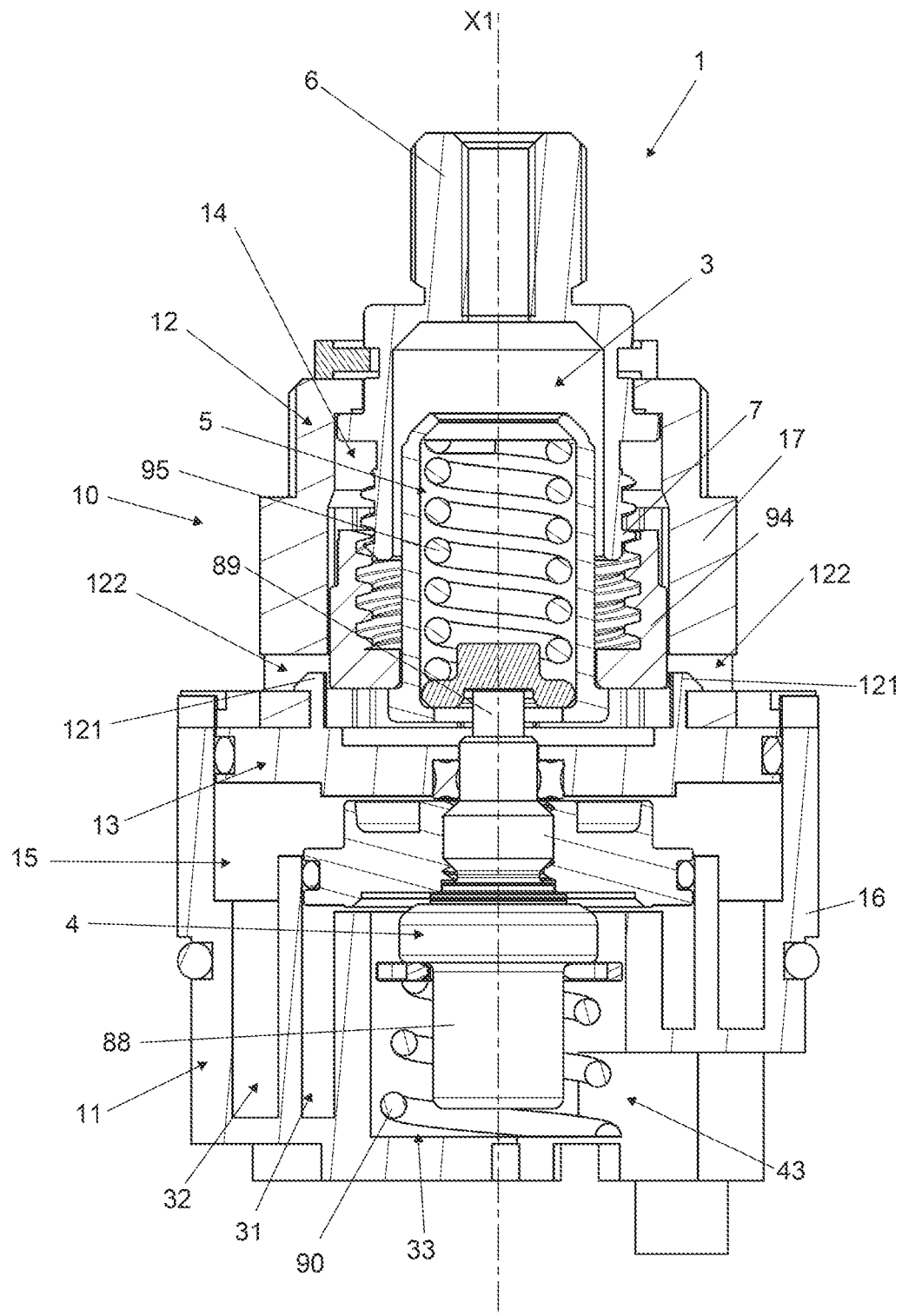
FIG. 10 is a longitudinal cross-sectional view of the device of FIG. 9 along the plane PX shown in FIG. 9.

For this embodiment in FIGS. 9 and 10, the device 1 comprises a fastener which is formed by the spacer 13 and the cover 12, by means of which the spacer 13 is attached to the cover 12, such that the spacer 13 is retained relative to the cover 12 along the distal direction X11. This has the advantage that the spacer 13 and the cover 12 are held together, even if the base 11 is not yet assembled, which is particularly convenient during the manufacture of the device 1. Advantageously, this fastener is provided when it is planned to first assemble the cover 12 with the spacer 13 and then the base 11.

Preferably, this fastener constitutes a snap-in system. For example, this fastener comprises snap hooks 121, which are formed by the spacer 13, and the snap notches 122, which are formed by the cover 12.

The hooks 121 are here two in number and are evenly distributed about the axis X1, but a different number of hooks 121 could be provided. For example, each hook 121 projects from the proximal face 23 in the direction X12, and opens radially outward.

Each notch 122 is formed in the peripheral wall 17, for example, opening radially inward to receive one of the hooks 121. Here, each notch 122 even extends radially through the wall 17. Radially outward, each notch 122 opens, for example, at the base of one of the fins 75.

Assembling the spacer 13 to the cover 12 therefore involves snapping the hooks 121 into the notches 122. More precisely, when the spacer 13 is fitted into the cover 12 along the direction X12, the hooks 121 deform radially inward until they reach the notches 122 where the hooks 121 resume their initial radial external shape, thus hooking into the notches 122, and retaining the spacer 13 in the distal direction X11 relative to the cover 12.

Alternatively, it may be provided that the cover 12 includes hooks while the spacer 13 has notches, to provide a fastener with a similar operation.

Any of the features described above for one embodiment or variant, may be implemented for the other described embodiments and variants, as far as technically possible.

The invention claimed is:

1. A device for a valve system, the device comprising:
a housing, which comprises a bottom, and by means of which the device can be coupled with a socket of the valve system, so that the housing exchanges water flows, with the socket by means of the bottom;
a slide valve which, in order to regulate the flow rate of at least one of said water flows, is movable in translation inside the housing, parallel to a longitudinal axis of the housing passing through the bottom, between a distal position, in which the slide valve is held against a distal seat of the housing and a proximal position, in which the slide valve is held against a proximal seat of the housing, the proximal seat being turned in a distal direction parallel to the longitudinal axis and the distal seat being turned in a proximal direction opposite to the distal direction; and
a control, for moving the slide valve in translation; wherein the housing comprises:
a base, which contains the slide valve and forms the bottom of the housing, the base comprising a proximal edge with a closed contour, surrounding the longitudinal axis and delimiting a proximal opening of the base, the distal direction being oriented from the proximal edge toward the bottom;
a spacer, which comprises an inner ring at least partially inserted into the proximal opening and being traversed by the longitudinal axis; and
a cover, which contains a part of the control, the control passing through the inner ring to move the slide valve; wherein:
the base forms the distal seat and the spacer forms the proximal seat, the proximal seat being carried by the inner ring;
the cover comprises a cover fin, by means of which the cover is held against the proximal edge along the distal direction; and
the spacer comprises a spacer fin, which is fixedly connected to the inner ring and by means of which the spacer is held against the proximal edge along the distal direction, the cover fin and the spacer fin being successive along the proximal edge.

2. The device according to claim 1, wherein the inner ring comprises:
a distal face, which carries the proximal seat, and
a proximal face, which is opposite to the distal face, which closes the cover, the spacer fin being projected along the proximal direction from the proximal face.

3. The device according to claim 1, wherein:
the inner ring comprises an outer radial edge that surrounds the longitudinal axis; and
the base comprises a first inner radial surface, which surrounds the longitudinal axis, which ends with the proximal edge along the proximal direction and which surrounds the outer radial edge, the spacer being inserted into the proximal opening by radial complementarity of the outer radial edge with the first inner radial surface.

4. The device according to claim 3, wherein the spacer is inserted into the proximal opening by radial complementarity of the outer radial edge with the first inner radial surface, by means of a seal of the device, which is radially interposed between the outer radial edge and the first inner radial surface.

5. The device according to claim 1, wherein:
the spacer fin comprises a first radial positioning surface; and
the cover comprises a second radial positioning surface, which surrounds the longitudinal axis, the cover being radially aligned with the spacer by holding the second radial positioning surface radially against the first radial positioning surface.

6. The device according to claim 1, in which the cover fin and the spacer fin are held in an anti-rotational manner about the longitudinal axis against each other.

7. The device according to claim 1, wherein:
the base comprises a tooth, which projects from the proximal edge; and
the cover fin and/or the spacer fin is/are held in an anti-rotational manner against the tooth, about the longitudinal axis.

8. The device according to claim 7, wherein:
the cover fin comprises two legs that provide between them an inner free portion; and
the tooth is received in the inner free portion to fix the base and the cover relative to each other in rotation about the longitudinal axis.

9. The device according to claim 1, wherein the device comprises a fastener, which is formed by the base and the cover, by means of which the base is attached to the cover, so that the base is retained relative to the cover along the distal direction by means of the fastener.

10. The device according to claim 1, wherein the cover is constituted by a first integrally formed piece, the spacer is constituted by a second integrally formed piece and the base is constituted by a third integrally formed piece.

11. The device according to claim 1, wherein the housing comprises:
- a mixing chamber, which is delimited by the base and which opens out of the housing by means of the bottom, for delivering an outgoing water flow, among said water flows, from the mixing chamber toward the socket, by means of the bottom, when the device is coupled with the socket;
- a primary chamber, which is delimited by the base, and which opens out of the housing by means of the bottom, for the admission of a primary incoming water flow, among said water flows, from the socket toward the primary chamber through the bottom, when the device is coupled with the socket, the primary chamber conducting the primary incoming water flow to the mixing chamber by means of a primary passage provided between the distal seat and the slide valve; and
- a secondary chamber, which is delimited by the base and the spacer, and which opens out of the housing by means of the bottom, for the admission of a secondary incoming water flow, among said water flows, from the socket toward the secondary chamber, by means of the bottom, when the device is coupled with the socket the secondary chamber conducting the secondary incoming water flow to the mixing chamber by means of a secondary passage provided between the proximal seat and the slide valve, the outgoing water flow being formed by mixing the primary incoming water flow with the secondary incoming water flow within the base.

12. The device according to claim 1, wherein the control comprises:
- a thermostatic actuator, which comprises:
- a primary part, which is at least partially contained in the base to be immersed in one of said water flows, the slide valve and the primary part being preferentially fixed in translation relative to each other along the longitudinal axis, and
- a secondary part, which is at least partially contained in the cover and which is displaced relative to the primary part in translation along the longitudinal axis, as a function of the temperature of the water flow in which the primary part is immersed; and
- a control member, which is at least partially contained in the cover and which is configured to move the slide valve in translation relative to the housing along the longitudinal axis, by displacement of the secondary part.

13. A valve system comprising:
- the device according to claim 1; and
- the socket, the device being coupled with the socket by means of the bottom so that the housing exchanges said water flows with the socket by means of the bottom.

\* \* \* \* \*